US006813382B2

(12) United States Patent
Mushano

(10) Patent No.: US 6,813,382 B2
(45) Date of Patent: Nov. 2, 2004

(54) IMAGE OUTLINE DETERMINATION METHOD, IMAGE OUTLINE DETERMINATION APPARATUS, IMAGE OUTLINE DETERMINATION PROGRAM STORAGE MEDIUM, IMAGE INPUT APPARATUS AND IMAGE INPUT PROGRAM STORAGE MEDIUM

(75) Inventor: Mitsuru Mushano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 63 days.

(21) Appl. No.: 10/046,663

(22) Filed: Jan. 16, 2002

(65) Prior Publication Data

US 2002/0141646 A1 Oct. 3, 2002

(30) Foreign Application Priority Data

Jan. 17, 2001 (JP) ........................................ 2001-009146
Jan. 17, 2001 (JP) ........................................ 2001-009157

(51) Int. Cl.$^7$ .............................. G06K 9/48; G06K 9/36
(52) U.S. Cl. ........................ 382/199; 382/216; 382/289
(58) Field of Search ................................. 382/190, 199, 382/203, 216, 289, 295, 296; 758/504, 450

(56) References Cited

U.S. PATENT DOCUMENTS 4,669,867 A * 6/1987 Uda ............................. 355/53
6,049,636 A    4/2000 Yang 2003/0053161 A1 * 3/2003 Li et al. ........................ 358/532

FOREIGN PATENT DOCUMENTS

| DE | 197 00 318 A1 | 7/1998 | |
| EP | 0 824 246 A2 | 2/1998 | |
| JP | 8-292015 | * 11/1996 | ........... G01B/11/00 |
| JP | 2000-508461 | 7/2000 | |

OTHER PUBLICATIONS

Takahiro Okamoto, Auto–setup in LuxScan4500 II, Japan Printing Society Journal; vol. 31, No. 1 (1994).

* cited by examiner

Primary Examiner—Jerome Grant, II
(74) Attorney, Agent, or Firm—Sughrue Mion, PLLC

(57) ABSTRACT

An image input apparatus receives image data from a scanner having a reading surface on which an original image is placed, the image data being generated through reading the reading surface. An image outline determination apparatus determines an outline of an original image placed on the reading surface of the scanner in accordance with the image data obtained by the scanner. An area designation section designates a rectangular proposed area of which at least portion enters into an area of the original image placed on the reading surface. An outline determination section determines the outline of the original image by repeating a plurality of number of times an area alteration processing in which a movement of sides defining an outline of the proposed area outside or inside the proposed area is determined in accordance with differential or difference of image data for vicinity of the sides, and the proposed area is altered in accordance with a decision of the movement, wherein the area alteration processing is repeated taking an area after the proposed area is altered as a new proposed area.

27 Claims, 17 Drawing Sheets

IMAGE OUTLINE DETERMINATION METHOD, IMAGE OUTLINE DETERMINATION APPARATUS, IMAGE OUTLINE DETERMINATION PROGRAM STORAGE MEDIUM, IMAGE INPUT APPARATUS AND IMAGE INPUT PROGRAM STORAGE MEDIUM

BACKGROUND OF THE INVENTION

1. Field of the Invention

The present invention relates to an image outline determination method of determining an outline of an original image placed on a reading surface of a scanner in accordance with image data obtained by the scanner, an image outline determination apparatus for implementing the image outline determination method as mentioned above, an image outline determination program storage medium storing an image outline determination program which causes a computer to operate as such an image outline determination apparatus, an image input apparatus for controlling the scanner to receive image data obtained through the scanner, and an image input program storage medium storing an image input program which causes a computer to operate as such an image input apparatus.

2. Description of the Related Art

Hitherto, it often happens that as a device for an input of an original image on which printing and an image printed out is based, generally, there is used a scanner for reading an image to obtain image data. Editing for creating a printed matter is performed by a combination of the image data obtained by the scanner and various sentences and illustrations, a set up is applied to image data obtained by the editing so that a good image quality of printed image or printing image can be obtained, and the printed image or the printing image are created in accordance with the image data after the set up. The set up implies processing for converting image data so that a good image quality of printed image or printing image can be obtained when the printed image or the printing image is created. The image data after the set up is once stored in a predetermined file for the successive processing.

To obtain image data through reading an image using the scanner, one or a plurality of photographs or one or a plurality of original images are placed on the reading surface of the scanner, and first the reading surface is read in its entirety with a rough resolution so that image data, which is rough throughout the reading surface, is created. Here, this reading is referred to as an "entire scan". The entire image based on the image data obtained through the entire scan is displayed on a display screen of an image display unit such as a CRT display. An operator operates a mouse or a keyboard to designate an image area in which an original image is actually placed on the reading surface of the scanner, of the entire image displayed on the display screen.

When an operator designates an image area, an image reading is performed with high resolution only for the designated image area, so that image data of high resolution only for the designated image area is created. This reading is referred to a "fine scan". Image data of high resolution obtained through the fine scan is used in editing for creating the printed matter.

Hitherto, for a series of processing of reading of original image by the scanner, set up, and storage of image data after the set up, as mentioned above, there is always needed an operation by an operator in halfway of such a series of processing. This imposes large burden on the operator.

As a main operation by an operator in halfway of a series of processing, there is raised an operation for designation of an area of an original placed on the reading surface of the scanner. That is, as mentioned above, an area of the original image is designated by an operation of an operator at the stage when the rough image, which is obtained by the entire scan, is displayed on the display screen. To designate the image area, when a plurality of original images is disposed on the reading surface of the scanner, there is a need to perform a designation of the image area on each of the original image. Further, in the event that the original image is placed obliquely with respect to the reading surface of the scanner, there is a need to designate the slanted image area, and it often happens that a number of sheets of original images is read while the entire scan and the fine scan are sequentially repeated. The designation of such an image area is a great burden for an operator.

In order to reduce a burden of the operator, there is performed a trial in which an image area is automatically detected in accordance with image data obtained through reading from the reading surface of the scanner (cf. Japanese Patent Publication Tokuhyou 2000-508461). According to a method disclosed in this publication, a straight line corresponding to the outline of the original image is detected by a combination of binarizing image data and technology of Haff transformation.

However, a number of straight lines exists on not only the outline of the original image but also inside the image, and thus there is a large possibility of erroneous detection. For example, when the original image is placed on the reading surface of the scanner, in order to avoid such a situation that the original image is inadvertently read in form of an indistinct image owing to a flare due to irradiation of light for reading the original image and a light flog occurring when a stray light enters the image reading sensor, it is a well-worn device that the original image is placed on a black sheet of which a size is larger than the original image and the original image placed on the black sheet is placed on the reading surface of the scanner. In this case, however, according to the method of the above-mentioned Japanese Publication, there is a high possibility that the outline of the black sheet, but not the outline of the original, is inadvertently detected.

Incidentally, here, it is explained that first the entire scan is performed to detect an image area in accordance with image data obtained through the entire scan. However, also in the event that from the beginning a great accuracy of reading is performed throughout the reading surface of the scanner without distinction of the entire scan and the fine scan and then the area of the image is cut out, the same problem as mentioned above occurs at the time of detection of the image area for cut out of the image area. Thus, this obliges the operator to perform the same operation for cutting off the image area.

SUMMARY OF THE INVENTION

In view of the foregoing, it is an object of the present invention to provide an image outline determination method of capable of determining an outline of an original image placed on a reading surface of a scanner with great accuracy, an image outline determination apparatus, and an image outline determination program storage medium storing an image outline determination program which causes a computer to operate as such an image outline determination apparatus capable of determining an outline of an original image with great accuracy.

Further, it is an object of the present invention to provide an image input apparatus capable of performing the above-mentioned series of processing upon reducing the operator's burden, and an image input program storage medium storing an image input program which causes a computer to operate as such an image input apparatus capable of performing the above-mentioned series of processing upon reducing the operator's burden.

To achieve the above-mentioned object, the present invention provides an image outline determination method of determining an outline of an original image placed on a reading surface of a scanner in accordance with image data obtained by the scanner, said image outline determination method comprising:

an area designation step of designating a rectangular proposed area of which at least portion enters into an area of the original image placed on the reading surface; and an outline determination step of determining the outline of the original image by repeating a plurality of number of times an area alteration processing in which a movement of sides defining an outline of the proposed area outside or inside the proposed area is determined in accordance with differential or difference of image data for vicinity of the sides, and the proposed area is altered in accordance with a decision of the movement, said area alteration processing being repeated taking an area after the proposed area is altered as a new proposed area.

According to the image outline determination method of the present invention as mentioned above, a rectangular proposed area, of which at least portion enters into an area of the original image placed on the reading surface, is designated, and an alteration of the proposed area is repeated in accordance with differential or difference of image data for vicinity of the sides defining an outline of the proposed area outside or inside the proposed area. This feature makes it possible to determine the outline of the original image with greater accuracy, since the proposed area is gradually coincident with the area of the original image.

In the image outline determination method according to the present invention as mentioned above, it is preferable that said outline determination step is a step in which said area alteration processing is replaced by an alternative area alteration processing in which a movement of sides defining an outline of the proposed area outside or inside the proposed area is determined in accordance with differential or difference of image data for vicinity of the sides and in addition a rotation of the proposed area in a normal direction or in a reversed direction is determined, and the proposed area is altered in accordance with a decision of the movement and the rotation, said alternative area alteration processing being repeated.

Including additionally the rotation of the new proposed area for the alteration of the proposed area makes it possible to determine the outline of the original image with greater accuracy, even if the original image is placed slantwise on the reading surface of the scanner.

It is noted that the image outline determination method of the present invention includes all the aspects which are implemented using the image outline determination apparatus or the image outline determination program as set forth below.

To achieve the above-mentioned object, the present invention provides an image outline determination apparatus for determining an outline of an original image placed on a reading surface of a scanner in accordance with image data obtained by the scanner, said image outline determination apparatus comprising:

an area designation section for designating a rectangular proposed area of which at least portion enters into an area of the original image placed on the reading surface; and an outline determination section for determining the outline of the original image by repeating a plurality of number of times an area alteration processing in which a movement of sides defining an outline of the proposed area outside or inside the proposed area is determined in accordance with differential or difference of image data for vicinity of the sides, and the proposed area is altered in accordance with a decision of the movement, said area alteration processing being repeated taking an area after the proposed area is altered as a new proposed area.

In the image outline determination apparatus according to the present invention as mentioned above, it is preferable that said area alteration processing is a processing in which an average value of four partial segments is determined for each side where two segments parallel to an associated side and having a substantially same length as the associated side are divided into two parts at the center for each side with respect to differential or difference of image data along the two segments for each side in the vicinity of the associated side, and a movement of the associated side outside or inside the proposed area is determined in accordance with a combination of four average values for each side.

Repetition of the area alteration processing makes it possible to determine the outline of the original image with greater accuracy.

In the image outline determination apparatus according to the present invention as mentioned above, it is preferable that said area alteration processing determines the movement of the associated side outside or inside the proposed area for each side, and moves the side determined in movement by a movement distance set to a mutually different value for each side.

This feature makes it possible to avoid such an erroneous detection that when a proposed area is sequentially altered, it is easy to shift the central point or the center of gravity of the proposed area, and thereby bringing a pseudo stability before coincidence with the area of the original image, so that the outline of the S original image is erroneously determined. Thus, according to the present invention, it is possible to determine the outline of the original image with greater accuracy.

In the image outline determination apparatus according to the present invention as mentioned above, it is preferable that said outline determination section determines beforehand a history of a coordinate value of a representative point of a proposed area to be sequentially altered, while said area alteration processing is repeated, and detects a vibration of an alteration of the proposed area to be sequentially altered in accordance with the history, and when the vibration is detected, said outline determination section alters an amount of movement of a respective side in said area alteration processing to a smaller value and repeats said area alteration processing.

Here, the "vibration of an alteration of the proposed area" implies that the position and the size of the proposed area are repeated alternately or in a short period, for example, in such manner that it is repeated that as a result of an alteration of a proposed area a position and a geometry of the proposed area are varied, as a result of an alteration of a proposed area varied in its position and its geometry of the proposed area the proposed is returned to the former position and geometry, and as a result of an alteration of the proposed area returned to the former the proposed area is varied again to the previous position and geometry, or as a result of repetition of an alteration of a proposed area the proposed are is expanded in some times and thereafter is reduced in some times and is expanded in some times.

As mentioned above, in the event that the vibration is detected, an amount of movement of a respective side in the area alteration processing is altered to a smaller value and the area alteration processing is repeated. This feature makes it possible that the outline of the proposed area to be sequentially altered is coincident with the outline of the original image with greater accuracy.

In the image outline determination apparatus according to the present invention as mentioned above, it is preferable that said outline determination section extracts image data correlated with brightness of respective points of an image from the image data obtained by said scanner and determines the movement of the sides outside or inside the proposed area in accordance with the image data correlated with the brightness.

The use of the image data correlated with the brightness makes it possible to perform the general-purpose of processing which is applicable to the various types of original images.

In the image outline determination apparatus according to the present invention as mentioned above, it is preferable that said outline determination section is a section in which said area alteration processing is replaced by an alternative area alteration processing in which a movement of sides defining an outline of the proposed area outside or inside the proposed area is determined in accordance with differential or difference of image data for vicinity of the sides and in addition a rotation of the proposed area in a normal direction or in a reversed direction is determined, and the proposed area is altered in accordance with a decision of the movement and the rotation, said alternative area alteration processing being repeated.

Also in this case, it is preferable that said area alteration processing is a processing in which an average value of four partial segments is determined for each side where two segments parallel to an associated side and having a substantially same length as the associated side are divided into two parts at the center for each side with respect to differential or difference of image data along the two segments for each side in the vicinity of the associated side, and a movement of the associated side outside or inside the proposed area and a rotation of the proposed area in a normal direction or in a reversed direction is determined in accordance with a combination of four average values for each side.

And it is preferable that said outline determination section determines beforehand a history of a coordinate value of a representative point of a proposed area to be sequentially altered, while said area alteration processing is repeated, and detects a vibration of an alteration of the proposed area to be sequentially altered in accordance with the history, and when the vibration is detected, said outline determination section alters an amount of movement of a respective side in said area alteration processing and an amount of rotation of the proposed area to a smaller value and repeats said area alteration processing.

Further, it is preferable that said outline determination section extracts image data correlated with brightness of respective points of an image from the image data obtained by said scanner and determines the movement of the sides outside or inside the proposed area and the rotation of the proposed area in a normal direction or in a reversed direction in accordance with the image data correlated with the brightness.

In the image outline determination apparatus according to the present invention as mentioned above, while it is acceptable that said area designation section designates a proposed area in accordance with an operator's instruction, for example, an operator designates a central one point of the original image, or alternatively an operator designates two points representative of the approximate position and size of the original image, it is preferable that said area designation section determines an average value of differential or difference of image data for a plurality of areas on the reading surface and designates the proposed area in accordance with the average value.

This feature makes it possible to designate the proposed area without an operator's operation.

Incidentally, in the event that the rotation of the proposed area is included for the alteration of the proposed area, the "vibration of an alteration of the proposed area" includes in addition to the vibration of the position and the size of the proposed area a vibration as to the rotation, for example, a matter that the posture of the proposed area is varied alternately or in a short period in such a manner that as a result of repetition of an alteration of a proposed area the proposed area rotates one or several number of times in a normal direction, and thereafter the proposed area rotates one or several number of times in the reversed direction and rotates one or several number of times in the normal reversed direction.

Further, in the image outline determination apparatus according to the present invention as mentioned above, it is preferable that when a plurality of original images are simultaneously placed on the reading surface, said area designation section designates, upon receipt of a decision of the outline of the original image by said outline determination section, a new proposed area associated with an original image different from the original image determined in an outline by said outline determination section at a position out of the outline of the original image determined by said outline determination section, on the reading surface, and said outline determination section restarts, upon receipt of the new proposed area by said area designation section, a repetition of said area alteration processing.

Alternate effect of the area designation section and the outline determination section makes it possible to determine the respective outlines of a plurality of original images even if the plurality of original images is simultaneously placed on the reading surface of the scanner.

To achieve the above-mentioned object of the present invention, there is provided an image outline determination program storage medium storing an image outline determination program which causes a computer to operate as an image outline determination apparatus for determining an outline of an original image placed on a reading surface of a scanner in accordance with image data obtained by the scanner, said image outline determination program stored in said image outline determination program storage medium comprising:

an area designation section for designating a rectangular proposed area of which at least portion enters into an area of the original image placed on the reading surface; and an outline determination section for determining the outline of the original image by repeating a plurality of number of times an area alteration processing in which a movement of sides defining an outline of the proposed area outside or inside the proposed area is determined in accordance with differential or difference of image data for vicinity of the sides, and the proposed area is altered in accordance with a decision of the movement, said area alteration processing being repeated taking an area after the proposed area is altered as a new proposed area.

In the image outline determination program storage medium according to the present invention as mentioned above, it is preferable that said area alteration processing is a processing in which an average value of four partial segments is determined for each side where two segments parallel to an associated side and having a substantially same length as the associated side are divided into two parts at the center for each side with respect to differential or difference of image data along the two segments for each side in the vicinity of the associated side, and a movement of the associated side outside or inside the proposed area is determined in accordance with a combination of four average values for each side.

In the image outline determination program storage medium according to the present invention as mentioned above, it is preferable that said area alteration processing determines the movement of the associated side outside or inside the proposed area for each side, and moves the side determined in movement by a movement distance set to a mutually different value for each side.

In the image outline determination apparatus according to the present invention as mentioned above, it is preferable that said outline determination section determines beforehand a history of a coordinate value of a representative point of a proposed area to be sequentially altered, while said area alteration processing is repeated, and detects a vibration of an alteration of the proposed area to be sequentially altered in accordance with the history, and when the vibration is detected, said outline determination section alters an amount of movement of a respective side in said area alteration processing to a smaller value and repeats said area alteration processing.

Here, a definition of the "vibration of an alteration of the proposed area" is the same as that in the image outline determination apparatus of the present invention as mentioned above. And thus the redundant explanation will be omitted.

In the image outline determination program storage medium according to the present invention as mentioned above, it is preferable that said outline determination section extracts image data correlated with brightness of respective points of an image from the image data obtained by said scanner and determines the movement of the sides outside or inside the proposed area in accordance with the image data correlated with the brightness.

In the image outline determination program storage medium according to the present invention as mentioned above, it is preferable that said outline determination section is a section in which said area alteration processing is replaced by an alternative area alteration processing in which a movement of sides defining an outline of the proposed area outside or inside the proposed area is determined in accordance with differential or difference of image data for vicinity of the sides and in addition a rotation of the proposed area in a normal direction or in a reversed direction is determined, and the proposed area is altered in accordance with a decision of the movement and the rotation, said alternative area alteration processing being repeated.

Also in this case, in a similar fashion to the above, in the image outline determination program storage medium according to the present invention as mentioned above, it is preferable that said area alteration processing is a processing in which an average value of four partial segments is determined for each side where two segments parallel to an associated side and having a substantially same length as the associated side are divided into two parts at the center for each side with respect to differential or difference of image data along the two segments for each side in the vicinity of the associated side, and a movement of the associated side outside or inside the proposed area is determined in accordance with a combination of four average values for each side.

In the image outline determination program storage medium according to the present invention as mentioned above, it is preferable that said outline determination section determines beforehand a history of a coordinate value of a representative point of a proposed area to be sequentially altered, while said area alteration processing is repeated, and detects a vibration of an alteration of the proposed area to be sequentially altered in accordance with the history, and when the vibration is detected, said outline determination section alters an amount of movement of a respective side in said area alteration processing to a smaller value and repeats said area alteration processing.

In the image outline determination program storage medium according to the present invention as mentioned above, it is preferable that said outline determination section extracts image data correlated with brightness of respective points of an image from the image data obtained by said scanner and determines the movement of the sides outside or inside the proposed area in accordance with the image data correlated with the brightness.

In the image outline determination program storage medium according to the present invention as mentioned above, while it is acceptable that said area designation section designates a proposed area in accordance with an operator's instruction, in a similar fashion to that of the outline determination apparatus, it is preferable that said area designation section determines an average value of differential or difference of image data for a plurality of areas on the reading surface and designates the proposed area in accordance with the average value.

Further, in the image outline determination program storage medium according to the present invention as mentioned above, it is preferable that when a plurality of original images are simultaneously placed on the reading surface, said area designation section designates, upon receipt of a decision of the outline of the original image by said outline determination section, a new proposed area associated with an original image different from the original image determined in an outline by said outline determination section at a position out of the outline of the original image determined by said outline determination section, on the reading surface, and said outline determination section restarts, upon receipt of the new proposed area by said area designation section, a repetition of said area alteration processing.

To achieve the above-mentioned object of the present invention, there is provided an image input apparatus comprising:

a scanner control section for controlling a scanner by a control signal, said scanner having a reading surface on which an original image is placed to be read and generating image data through reading the reading surface when said scanner receives the control signal;

an image input section for receiving the image data generated by said scanner;

an image recognition section for recognizing an outline of an original image placed on the reading surface in accordance with the image data obtained through reading throughout the reading surface, which is fed to said image input section;

an image transformation section for performing a transformation of image data inside an image area encircled by the outline of the original image recognized by said image recognition section into reproduction image data to output a reproduction image in which image quality is adjusted by an output device for outputting the reproduction image in accordance with the reproduction image data;

an image storage section for storing the reproduction image data obtained by said image transformation section;

a start handler for instructing a start of reading of an original image; and an operation control section responsive to an operation of said start handler for continuously performing a series of operations of a control for said scanner by said scanner control section, a receipt of the image data by said image input section, a recognition of the outline of the original image by said image recognition section, a transformation into the reproduction image data by said image transformation section, and a storage of the reproduction image data by said image storage section, said series operations being performed without being subjected to an operation by an operator halfway.

According to the image input apparatus of the present invention as mentioned above, particularly there is provided the image recognition section so that the outline of the original image placed on the reading surface is recognized in accordance with the image data. This feature makes it possible to avoid necessity of an operation for designating an area of an original image by an operator. Further, according to the image input apparatus of the present invention, a set-up is performed by the image transformation section, and the reproduction image data after the set-up is stored. This feature makes it possible to continuously perform a series of processing of a control of the scanner, reading of image data, recognition of an outline of an original image, a transformation (set-up) to reproduction image data, and storage of the reproduction image data.

In the image input apparatus according to the present invention as mentioned above, it is acceptable that said scanner has a first reading mode in which said reading surface is roughly read to generate a first image data of relatively low resolution, and a second reading mode in which said reading surface is finely read to generate a second image data of relatively high resolution, said operation control section causes, upon receipt of an operation of said start handler by an operator, said scanner control section to send to said scanner a first control signal to perform a reading in the first reading mode, said image input section to receive the first image data obtained in the first reading mode by said scanner, said image recognition section to recognize an outline of an original image in accordance with the first image data, said scanner control section to send to said scanner a second control signal to perform a reading in the second reading mode, said image input section to receive the second image data obtained in the second reading mode by said scanner, said image transformation section to transform the second image data inside the image area encircled by the outline of the original image recognized by said image recognition section in accordance with the first image data into the reproduction image data, and said image storage section to store the reproduction image data transformed from the second image data.

To achieve the above-mentioned object of the present invention, there is provided an image input program storage medium storing an image input program which causes a computer to operate as an image input apparatus for receiving image data obtained by a scanner having a reading surface on which an original image is placed to be read, said scanner generating the image data through reading the reading surface when said scanner receives a control signal, said image input program stored in said image input program storage medium comprising:

a scanner control section for controlling said scanner by a control signal;

an image input section for receiving the image data generated by said scanner;

an image recognition section for recognizing an outline of an original image placed on the reading surface in accordance with the image data obtained through reading throughout the reading surface, which is fed to said image input section;

an image transformation section for performing a transformation of image data inside an image area encircled by the outline of the original image recognized by said image recognition section into reproduction image data to output a reproduction image in which image quality is adjusted by an output device for outputting the reproduction image in accordance with the reproduction image data;

an image storage section for storing the reproduction image data obtained by said image transformation section;

a start handler display section for displaying a start handler for instructing a start of reading of an original image; and an operation control section responsive to an operation of said start handler for continuously performing a series of operations of a control for reading of said scanner by said scanner control section, a receipt of the image data by said image input section, a recognition of the outline of the original image by said image recognition section, a transformation into the reproduction image data by said image transformation section, and a storage of the reproduction image data by said image storage section, said series operations being performed without being subjected to an operation by an operator halfway.

In the image input program storage medium according to the present invention as mentioned above, it is acceptable that said scanner has a first reading mode in which said reading surface is roughly read to generate a first image data of relatively low resolution, and a second reading mode in which said reading surface is finely read to generate a second image data of relatively high resolution, said operation control section causes, upon receipt of an operation of said start handler by an operator, said scanner control section to send to said scanner a first control signal to perform a reading in the first reading mode, said image input section to receive the first image data obtained in the first reading mode by said scanner, said image recognition section to recognize an outline of an original image in accordance with the first image data, said scanner control section to send to said scanner a second control signal to perform a reading in the second reading mode, said image input section to receive the second image data obtained in the second reading mode by said scanner, said image transformation section to transform the second image data inside the image area encircled by the outline of the original image recognized by said image recognition section in accordance with the first image data into the reproduction image data, and said image storage section to store the reproduction image data transformed from the second image data.

as mentioned above, according to the image input apparatus of the present invention or the image input program stored in the image input program storage medium, it is possible to perform a series of processing from reading of an original image to set-up and storage of image data after the set-up.

DETAILED DESCRIPTION OF PREFERRED EMBODIMENTS

Embodiments of the present invention will be described with reference to the accompanying drawings.

Figure 1:
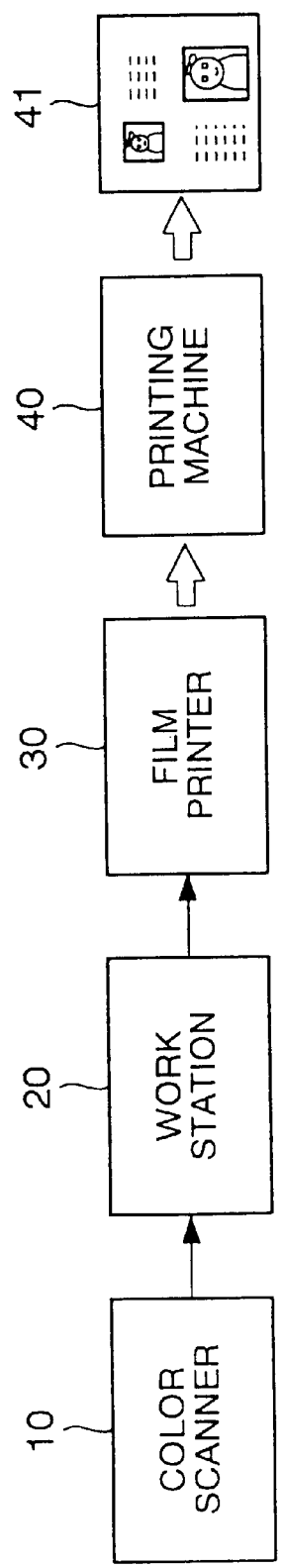
FIG. 1 is a schematic constitution view of a printing system into which an embodiment of an image outline determination apparatus of the present invention is incorporated.

FIG. 1 is a schematic constitution view of a printing system into which an embodiment of an image outline determination apparatus of the present invention is incorporated.

A color scanner 10 reads an original image and creates color separation image data for three colors consisting of cyan (C), magenta (M) and yellow (Y), which represent the read original image. The image data of CMY produced by the scanner 10 is fed to a workstation 20. The workstation 20 is constituted of a personal computer, and mainly performs an electronic page make-up (editing). The workstation 20 serves as an embodiment of an image outline determination apparatus of the present invention and an embodiment of an image input apparatus of the present invention. That is, the color scanner 10 performs the above-mentioned entire scan throughout the reading surface in accordance with an instruction from the workstation 20 to generate rough (low in resolution) CMY of image data. The image data thus generated is fed to the workstation 20. Upon receipt of the rough image data, the workstation 20 determines an outline of the original image on the reading surface of the color scanner 10 in accordance with the rough image data. Next, the color scanner 10 performs the fine scan for the area of the original image in accordance with an instruction of the workstation 20. High resolution of image data of CMY, which is obtained through the fine scan, is again fed to the workstation 20. Upon receipt of the image data, the workstation 20 performs the editing using the high resolution of image data.

The workstation 20 receives character data and graphic image, as a need arises, as well as the image data of the original image obtained by the color scanner 10. Alternatively, the workstation 20 creates character data and graphic image by itself. The workstation 20 puts those data together and performs electronic editing (electronic page make-up).

The printed original document created by the electronic page make-up is subjected to a set up, so that it is converted into image data of four colors in which K (black) is added to CMY, or five or more colors in which the spot color is added to CMYK, and the converted image data is once stored in a predetermined file for the successive processing.

The image data after the set up stored in the file is fed to a film printer 30 to create printing film original plates for CMYK and in some case for additional colors in which the spot color is added to CMYK, associated with the image data.

Machine plates are created from those printing film original plates, and the thus created machine plates are mounted on a printing machine 40. Applied to the machine plates mounted on the printing machine are inks of colors associated with the respective machine plates, respectively. The applied inks are transferred to a printing sheet so that a printed image 41 is formed on the sheet.

Figure 2:
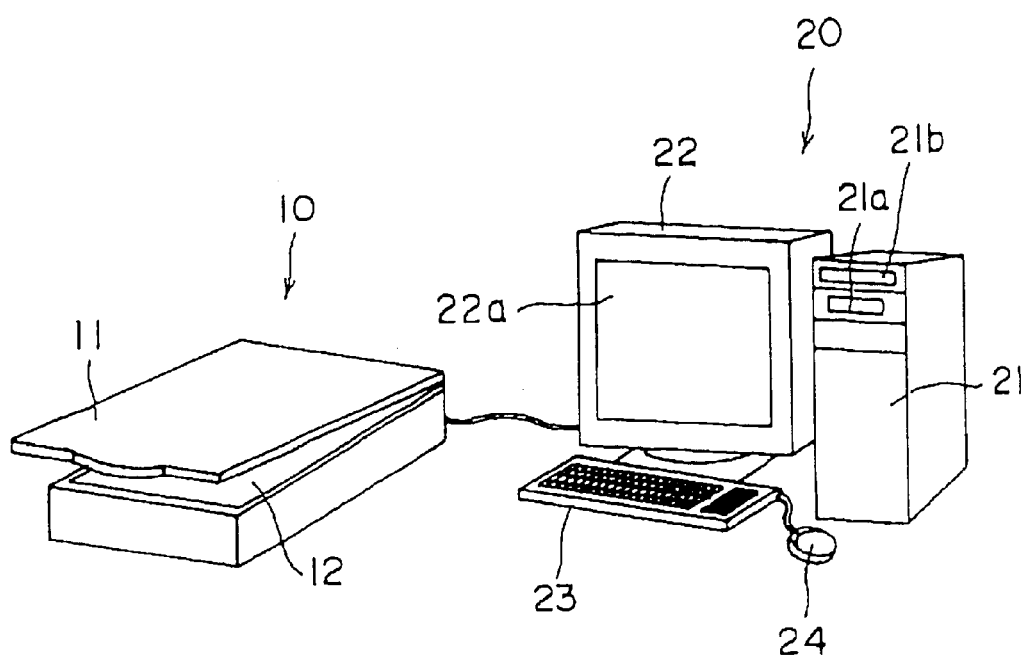
FIG. 2 is a perspective view of a color scanner and a workstation shown in FIG. 1.
Figure 3:
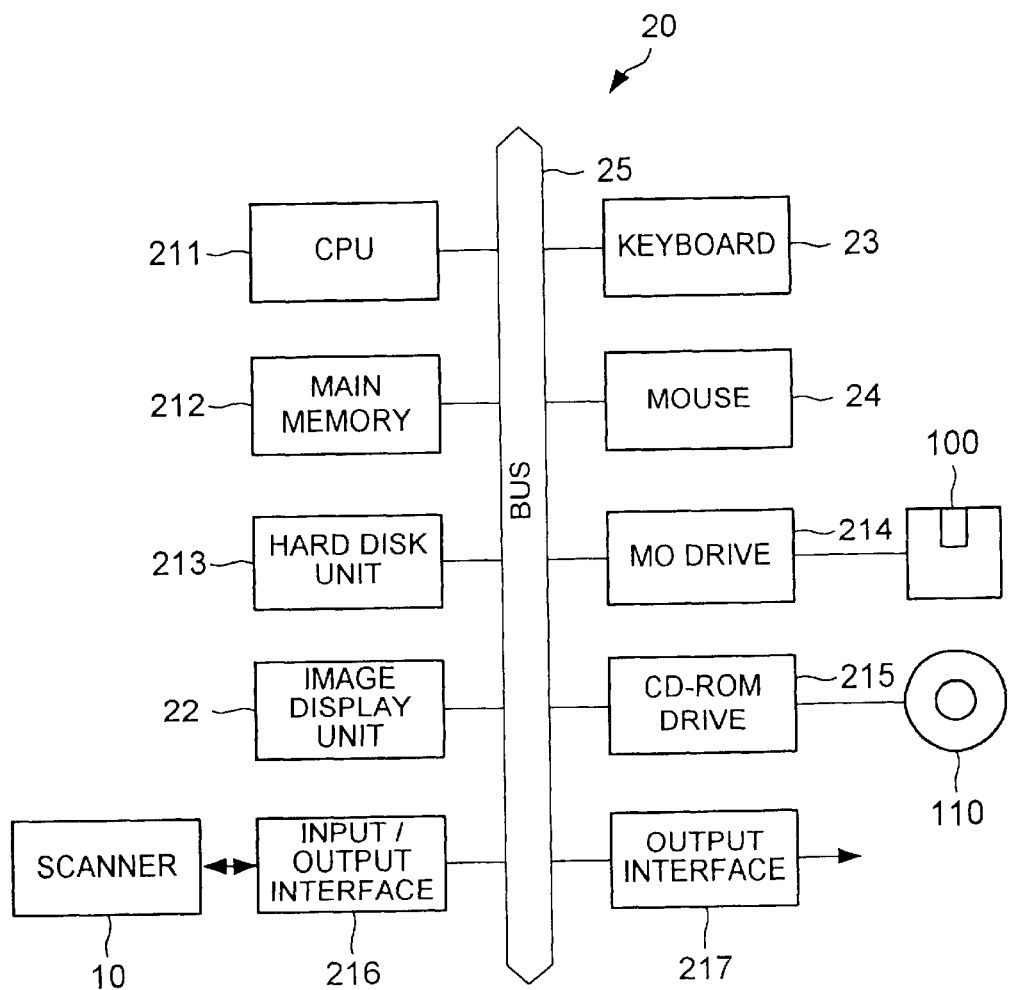
FIG. 3 is a hardware structural view of the workstation.

FIG. 2 is a perspective view of a color scanner and a workstation shown in FIG. 1. FIG. 3 is a hardware structural view of the workstation.

A cover 11 of the color scanner 10 is opened to place one or a plurality of sheets (three sheets in case of the embodiment (cf. FIG. 7) which will be described later) of original images on a reading surface 12, and then the cover 11 is closed to scan the reading surface 12 by a line-shaped reading light and a line sensor (not illustrated) for image reading, so that the reading surface (including the original image placed thereon) is read to generate image data. The color scanner 10 generates, as mentioned above, image data for three colors of C, M and Y to be fed to the workstation 20.

Incidentally, while FIG. 2 shows, by way of example, a reflection type of color scanner in which image data is obtained in such a manner that reading light is applied to the original image and light reflected on the original image is received, it is acceptable to adopt a transmission type of color scanner in which image data is obtained in such a manner that reading light is applied to the original image and light transmitted through the original image is received, or alternatively it is acceptable to adopt such a type of color scanner having both functions of the reflection type and the transmission type that those functions are selectively switched. Here, there will be continued the explanation assuming that the reflection type of color scanner is adopted.

The workstation 20, which is constituted of a personal computer, comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has an MO disk mounting slot 21a for mounting a MO disk 100, and a CD-ROM mounting slot 21b for mounting a CD-ROM 110. The workstation 20 also serves as an embodiment of an image outline determination apparatus and an embodiment of an image input apparatus.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an MO drive 214 for accessing an MO disk 100 mounted thereon, a CD-ROM drive 215 for accessing a CD-ROM 110 mounted thereon, an input and output interface 216 connected to the color scanner 10, to operate the color scanner 10 and to receive image data from the color scanner 10, and an output interface 217 to transmit image data to the film printer 30 (cf. FIG. 1). These various types of elements are connected via a bus 25 to the image display unit 22, the keyboard 23 and the mouse 24.

The CD-ROM 110 stores therein an image outline determination program and an image input program for causing the workstation 20 to operate as an embodiment of an image outline determination apparatus of the present invention and an embodiment of an image input apparatus of the present invention, respectively. The CD-ROM 110 is mounted on the CD-ROM drive 215 so that the image outline determination program and the image input program, which are stored in the CD-ROM 110, are up-loaded on the workstation 20 and are stored in the hard disk unit 213.

Hereinafter, there will be separately explained an embodiment of an image outline determination apparatus of the present invention constructed in the workstation 20 shown in FIGS. 2 and 3 and an embodiment of an image input apparatus of the present invention constructed in the workstation 20 shown in FIGS. 2 and 3.

Figure 4:
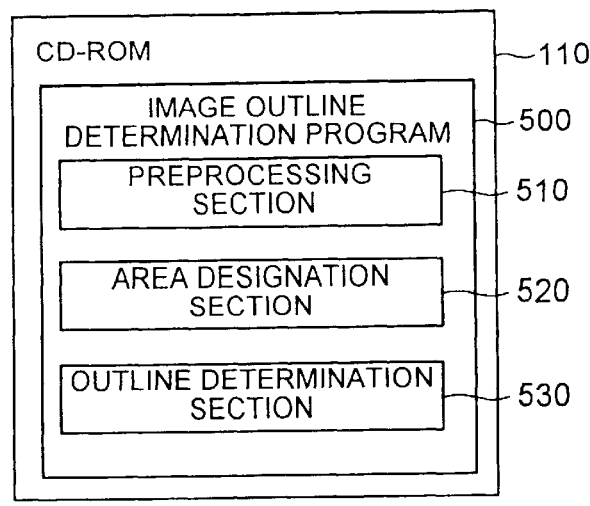
FIG. 4 is a typical illustration showing a structure of an image outline determination program stored in a CD-ROM.

FIG. 4 is a typical illustration showing a structure of an image outline determination program stored in a CD-ROM.

An image outline determination program 500 stored in a CD-ROM 110 comprises a preprocessing section 510, an area designation section 520 and an outline determination section 530. Contents of the respective sections of the image outline determination program 500 will be described later.

The preprocessing section 510 is not always necessary. However, for some original image or some image data obtained through reading the original image, the preprocessing by the preprocessing section 510 is useful for determination of the outline of the original image with greater accuracy. It is interpretable that the preprocessing section 510 is included in the outline determination section referred to in the present invention together with the outline determination section 530.

Figure 5:
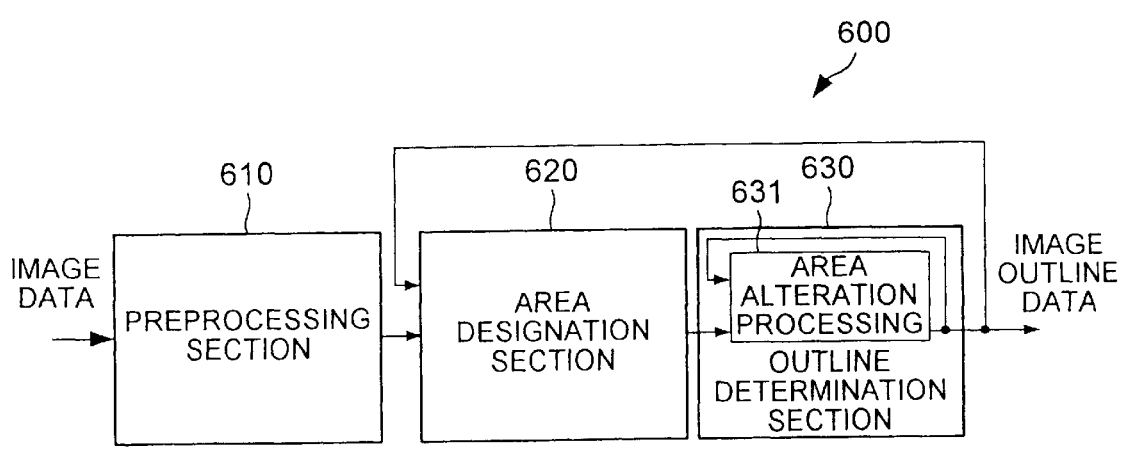
FIG. 5 is a functional block diagram of an embodiment of an image outline determination apparatus according to the present invention.

FIG. 5 is a functional block diagram of an embodiment of an image outline determination apparatus according to the present invention.

An image outline determination apparatus 600 shown in FIG. 5 is implemented when the image outline determination program 500 shown in FIG. 4 is installed onto the workstation 20 shown in FIGS. 1 to 3 and is executed by the workstation 20. The image outline determination apparatus 600 shown in FIG. 5 comprises a preprocessing section 610, an area designation section 620 and an outline determination section 630. The outline determination section 630 of the image outline determination apparatus 600 shown in FIG. 5 repeatedly performs an area alteration processing 631.

The preprocessing section 610, the area designation section 620 and the outline determination section 630 correspond to the preprocessing section 510, the area designation section 520 and the outline determination section 530 as program parts constituting the image outline determination program 500 shown in FIG. 4, respectively. The preprocessing section 610, the area designation section 620 and the outline determination section 630 constituting the image outline determination apparatus 600 shown in FIG. 5 are implemented by a combination of a hardware and a software. On the other hand, the preprocessing section 510, the area designation section 520 and the outline determination section 530 as program parts constituting the image outline determination program 500 shown in FIG. 4 indicate only portions of application programs of the associated sections of the image outline determination apparatus 600 shown in FIG. 5.

Similar to the case of the image outline determination program 500 shown in FIG. 4, the preprocessing section 610 is not always necessary. However, for some original images or some properties of image data, it is preferable to apply the preprocessing section 610 to the image outline apparatus. In comparison with the image outline determination apparatus of the present invention, it is interpretable that the preprocessing section 610 is included in the outline determination section referred to in the present invention.

Figure 6:
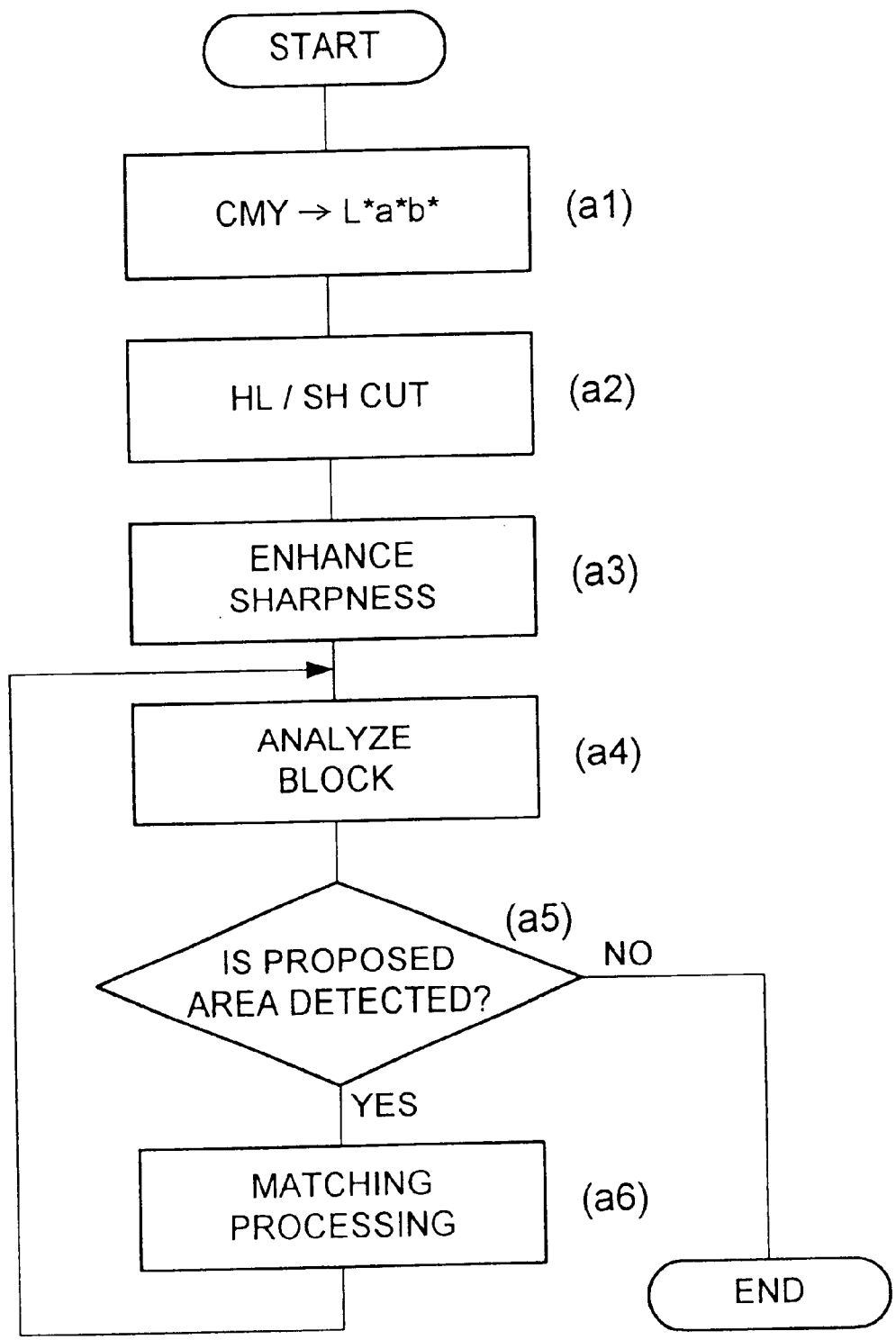
FIG. 6 is a flowchart useful for understanding the image outline determination program to be executed in the workstation shown in FIGS. 1–3.

FIG. 6 is a flowchart useful for understanding the image outline determination program to be executed in the workstation shown in FIGS. 1–3. Hereinafter, a functional effect of the respective sections of the image outline determination program shown in FIG. 4 and a functional effect of the respective sections of the image outline determination apparatus shown in FIG. 5 will be explained in conjunction with an explanation of the image outline determination program.

In the flowchart shown in FIG. 6, steps a1 to a3 correspond to the preprocessing sections 510 and 610 shown in FIGS. 4 and 5; a step a4 to the area designation sections 520 and 620 shown in FIGS. 4 and 5; and steps a5 and a6 correspond to the outline determination sections 530 and 630 shown in FIGS. 4 and 5.

First, in the manner as mentioned above, an original image is placed on the reading surface 12 of the color scanner 10 shown in FIG. 3. Thereafter, an operator operates the workstation 20 so that an instruction of the entire scan is outputted to the color scanner 10. Upon receipt of the instruction, the color scanner 10 performs the entire scan to roughly read throughout the reading surface 12, and transmits image data of CMY thus obtained to the workstation 20. The workstation 20 receives the image data of CMY obtained through the entire scan, and performs the routine shown in FIG. 6 in accordance with image data.

Figure 7:
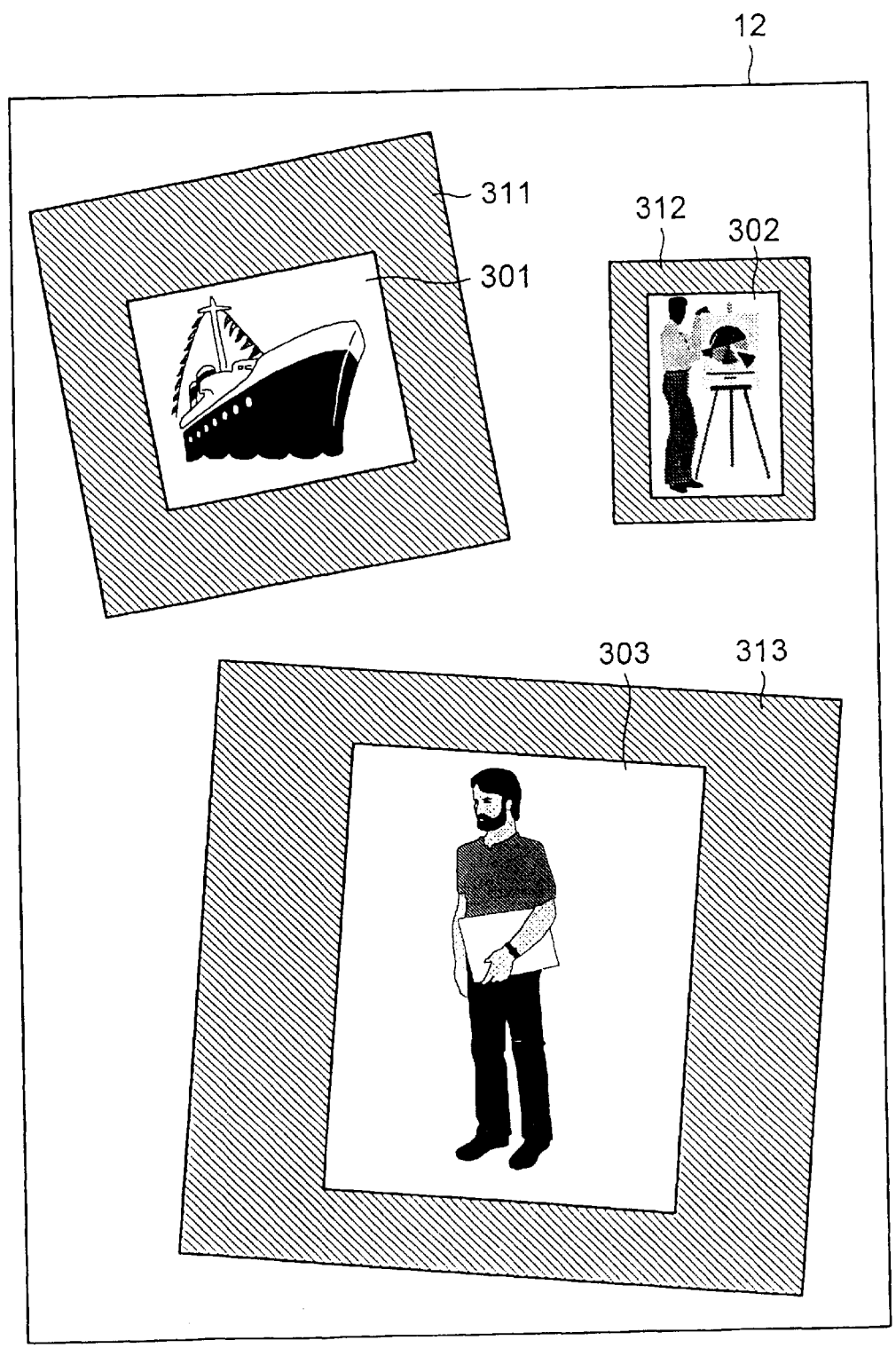
FIG. 7 is a view showing a state that an original image is placed on the reading surface of the scanner.

FIG. 7 is a view showing a state that an original image is placed on the reading surface of the scanner.

In the routine shown in FIG. 6, first, the image data of CMY is converted into three colors of image data, for example, R (red), G (green) and B (blue) once, and then converted into image data represented by L*a*b* (a step a1). In a step a2 and the subsequent steps, there is adopted only image data of L* representative of the lightness. Incidentally, it is not always necessary that the processing in the step a2 and the subsequent steps be based on image data representative of the lightness in the strict sense of the word. Any one is acceptable, as the image data, which correlates with the lightness. For some original image, for example, it is acceptable that the step a1 is omitted and processing based on the image data of M (magenta) is carried out.

In a step a2, highlight portion (HL) and shadow portion (SH) of image data representative of the lightness are clipped so as not to exceed certain values, respectively. For example, in the event that the pixel values are expressed by the numerical values 0–255, all the pixel values 0–30 are replaced by the pixel values 30, and all the pixel values 230–255 are replaced by the pixel values 230.

Here, three original images 301, 302 and 303 are placed on the reading surface 12 in a state that they are pasted on the black sheets 311, 312 and 313, respectively. The reason why the original images are pasted on the black sheets is that flare and the like due to light associated with diffused reflection on edges of the original images are prevented from occurring on an image received in form of the image data.

FIG. 7 shows, for the purpose of easy understanding, the original images that are placed upward. However, indeed, the original images are placed downward on the reading surface 12. Further, as shown in FIG. 7, it is acceptable that the original images are placed slantwise with respect to the reading surface 12.

The processing of the step a2 will emphasize noises when a sharpness emphasis processing at the next step a3 is carried out for the masking portions and the unmasked portions (the black sheets 311, 312 and 313 surrounding the original images 301, 302 and 303, respectively, and unmasked portions) on reading surface 12. Thus, the clip processing at the step a2 prevents the masking portion and the unmasked portion from being subjected to the sharpness emphasis processing.

The step a3 performs the sharpness emphasis processing. While an absolute mean of differences of adjacent pixels is computed in a matching processing in a step a6 which will be described later, the sharpness emphasis processing at the step a3 serves as a processing in which when the absolute mean of differences of adjacent pixels is computed, an aspect of the image is emphasized.

In a step a4, there is performed the following block analysis processing for the image data subjected to the preprocessing of the steps a1–a3 as mentioned above.

In the block analysis processing, an image throughout the reading surface is divided on a two-dimensional basis into a plurality of blocks (n×m), and for each block, absolute values of differences of pixel values of adjacent pixels in the block are accumulated and the accumulated value is divided by the number of pixels of the block so that an absolute value mean of the difference is determined for each block. Thus, a block, in which the absolute value mean exceeds a certain threshold, is extracted. It is decided that an area, in which the thus extracted blocks are gathered, is an area in which the original images exist on the reading surface.

Figure 8:
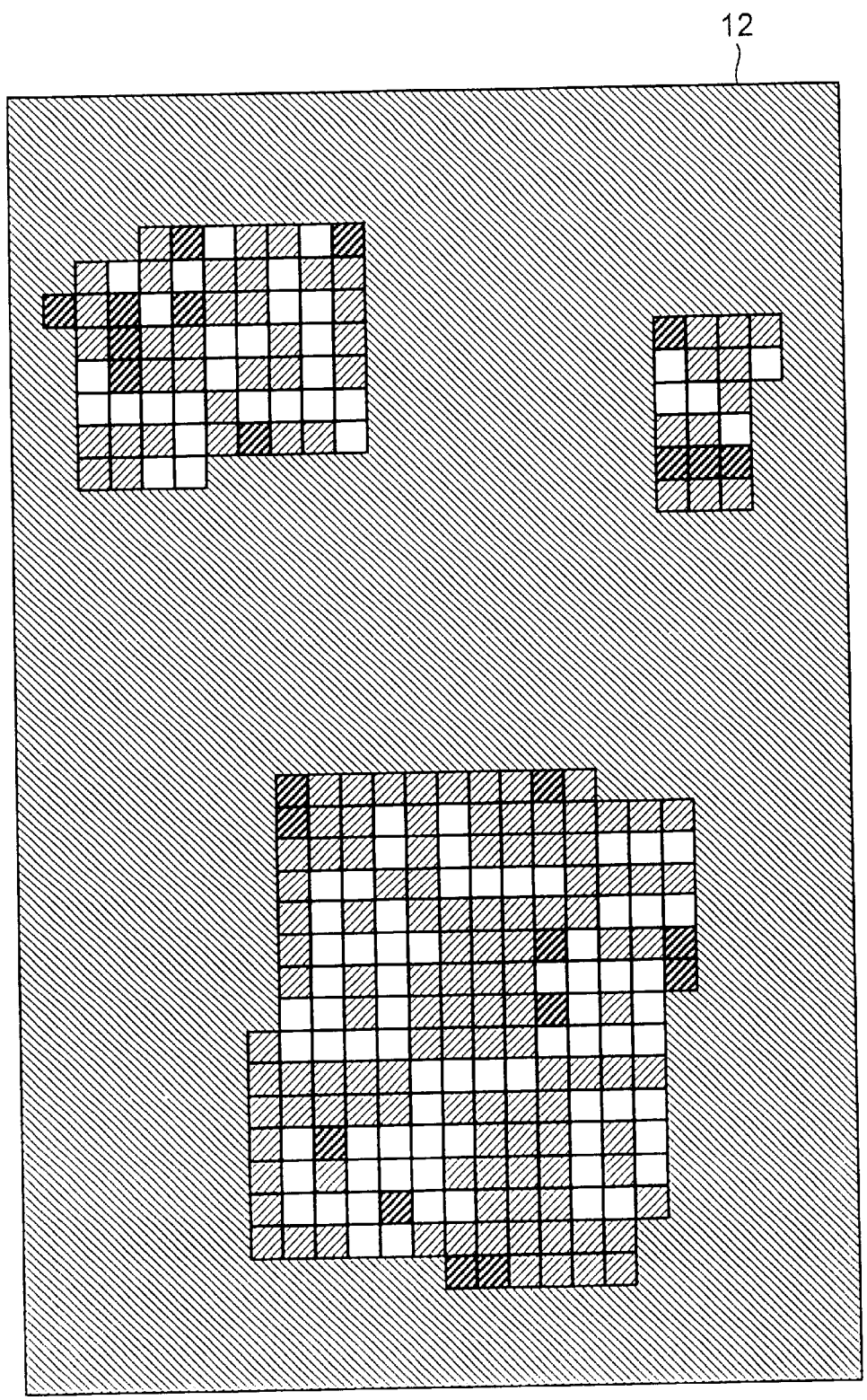
FIG. 8 is a view showing an image representative of a block analysis processing result.

FIG. 8 is a view showing an image representative of a block analysis processing result.

In FIG. 8, white or the more rough hatching is applied to the block of the larger absolute mean of the difference, and the more fine hatching is applied to the block of the smaller absolute mean.

FIG. 8 shows three sets of block having a value not less than a certain threshold, those three sets corresponding to the areas for three original images shown in FIG. 7.

Here, of a large number of blocks constituting those three sets, one block having the largest value is selected. Incidentally, it is not necessary that the block to be selected is a block having the largest block, and it is acceptable that a block of the center of one set is selected, or alternatively an arbitrary one block having a value not less than a threshold is selected. Here, thus extracted or selected one block is referred to as a "proposed area".

Now returning to FIG. 6 the explanation will be continued.

In a step a5 of FIG. 6, it is decided whether the block analysis of the step a4 detects or selects the proposed area.

The step a5 will be explained later more in detail. When it is decided in the step a5 that no proposed area is detected, the routine shown in FIG. 6 is terminated.

On the other hand, when it is decided in the step a5 that a proposed area is detected, the procedure goes to a step a6 in which a matching processing for determining an outline of the original image is executed. The matching processing will be described in detail later. When an outline of an original image is determined in accordance with the matching processing, the process returns to the step a4. When the program returns to the step a4, the step a4 does not repeat the above-mentioned block analysis processing from the first, and erases a set of blocks corresponding to the outline of the original image now determined in the step a6 (the blocks constituting this set are dealt with as blocks each having a value less than a threshold), using the result of the block analysis processing determined as in FIG. 8, and selects a block having the maximum value, as a new proposed area, from among the remaining blocks each having a value not less than the threshold.

In this manner, when the steps a4 to a6 are repeated by the number of original images (in case of the example shown in FIG. 8, it is three), the step a5 detects no new proposed area, and designates that no proposed area detects and terminates the routine of FIG. 6.

Figure 9:
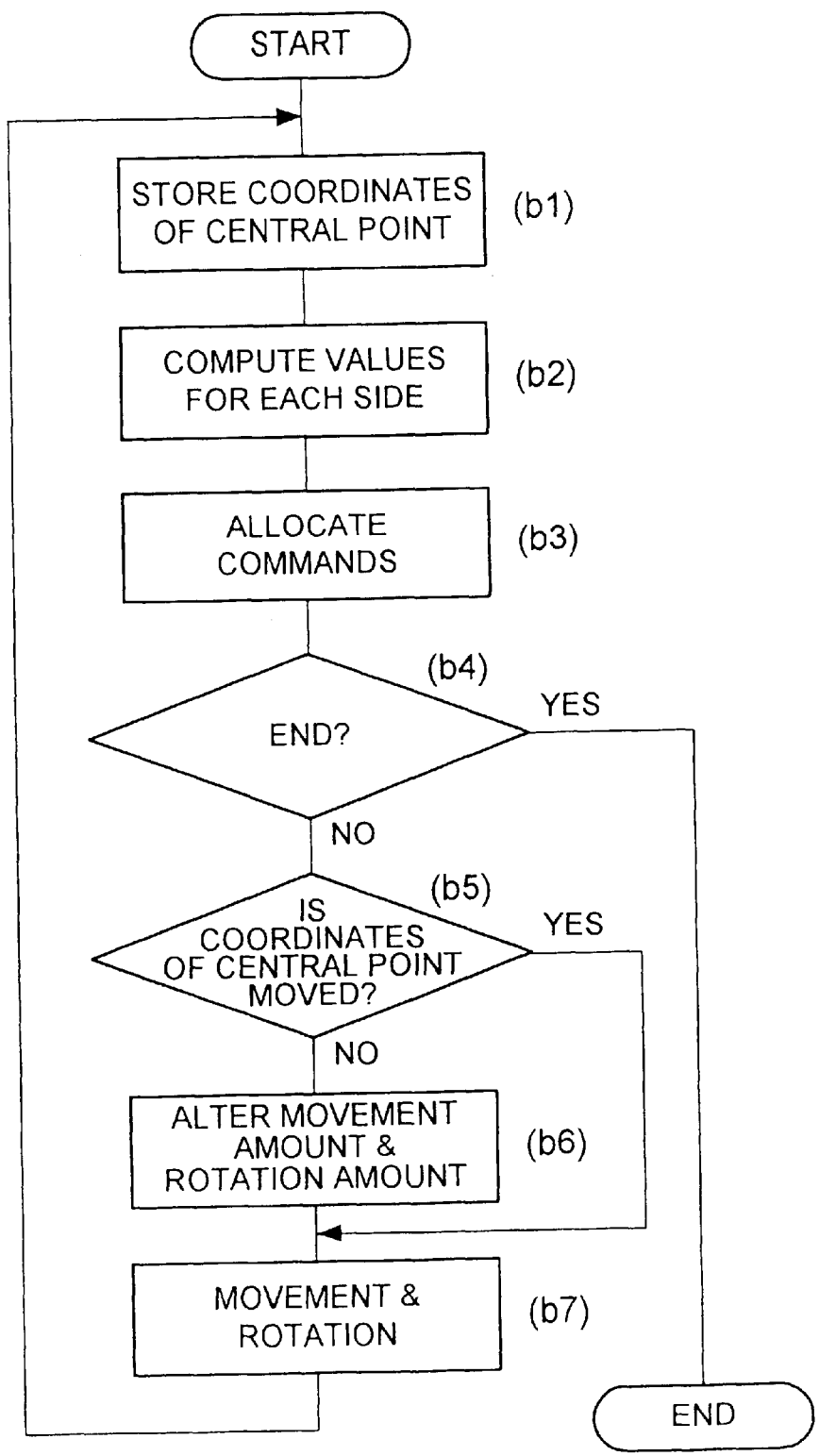
FIG. 9 is a detailed flowchart useful for understanding a mapping processing shown in FIG. 6 as one step.

FIG. 9 is a detailed flowchart useful for understanding a mapping processing shown in FIG. 6 as one step.

Here, first, the coordinates of the central point of the proposed area determined in form of historical information are stored (a step b1), and then values for the sides of the proposed area are computed as follows (a step b2).

Figure 10:
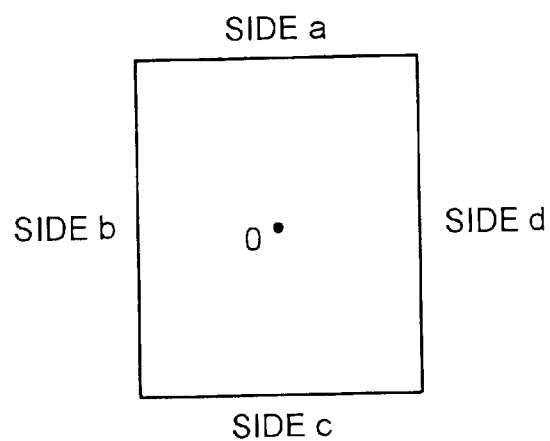
FIG. 10 is a view showing an area proposed.

FIG. 10 is a view showing a proposed area.

The proposed area shown in FIG. 10 has a rectangular shape encircled by four sides a, b, c and d. FIG. 10 shows the central point O of the rectangular proposed area. In the step b1, a history of coordinates of the central point O is stored.

Figure 11:
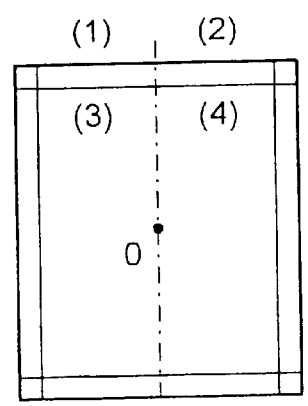
FIG. 11 is an explanatory view useful for understanding a method of computing values of sides of the proposed area.

FIG. 11 is an explanatory view useful for understanding a method of computing values of sides of the proposed area.

Hereinafter, there will be explained a method of determining values related to the side a shown in FIG. 10 in conjunction with FIG. 11. With respect to the sides b, c and d also, they are determined in a similar fashion to that of the side a.

In FIG. 11, when a straight line is drawn to divide the side a passing through the central point O of the proposed area, two partial segments of the right and left of the side a are expressed by (1) and (2), respectively. And when the segment, which is parallel to the side a and enters inside the proposed area by the corresponding three pixels, is divided into the right and the left by the straight line passing through the central point O, two partial segments are expressed by (3) and (4), respectively.

Here, with respect to the side a, for each of four partial segments (1), (2), (3) and (4), there is determined a cumulative value of the absolute values of the differences between the pixel values of the adjacent pixels of a number of pixels arranged on the associated partial segment. The cumulative value for each of the partial segments (1), (2), (3) and (4) is divided by the number of pixels arranged on the associated partial segment. Thus, for each of the partial segments (1), (2), (3) and (4), the absolute value mean of the difference is determined. Here, further, the absolute value mean of the difference, which is determined for each of the partial segments (1), (2), (3) and (4), is compared with a threshold. In the event that the absolute value mean is not less than the threshold, '1' is allotted, and in the event that the absolute value mean is not above than the threshold, '0' is allotted. Thus, with respect to the side a, for each of four partial segments (1), (2), (3) and (4), there is allotted any one of '1' or '0', so that a numerical value represented by 4 bits on the side a is determined. Likely, also with respect to the sides b, c and d, the respective numeral value represented by 4 bits is determined.

Next, commands are allotted to the side a in accordance with the numerical value of 4 bits corresponding to four partial segments (1), (2), (3) and (4) thus determined on the side a.

Table 1 is an association table between numerical values of 4 bits and commands.

TABLE 1

| 0 (0000) | Narrow  | 8 (1000)  | unknown |
| 1 (0001) | Plus    | 9 (1001)  | unknown |
| 2 (0010) | Minus   | 10 (1010) | minus   |
| 3 (0011) | Hold    | 11 (1011) | wide    |
| 4 (0100) | Unknown | 12 (1100) | wide    |
| 5 (0101) | Plus    | 13 (1101) | wide    |
| 6 (0110) | unknown | 14 (1110) | wide    |
| 7 (0111) | wide    | 15 (1111) | wide    |

Table 1 means that when the numerical value 0, that is, (0, 0, 0, 0) in 4 bits expression, is given, the command 'narrow' is allotted, when the numerical value 1, that is, (0, 0, 0, 1) in 4 bits expression, is given, the command 'plus' is allotted, and when the numerical value 2, that is, (0, 0, 1, 0) in 4 bits expression, is given, the command 'minus' is allotted. This is similar with respect to the numerical values 3–17.

Here, as shown in table 1, there are prepared 6 commands of 'narrow', 'plus', 'minus', 'hold', unknown' and 'wide'.

Table 1 is applicable to not only the side a, but also the sides b to d on a common basis. Also with respect to the sides b to d, in a similar fashion to that of the side a, any one of the above-mentioned 6 commands is allotted.

Figure 12:
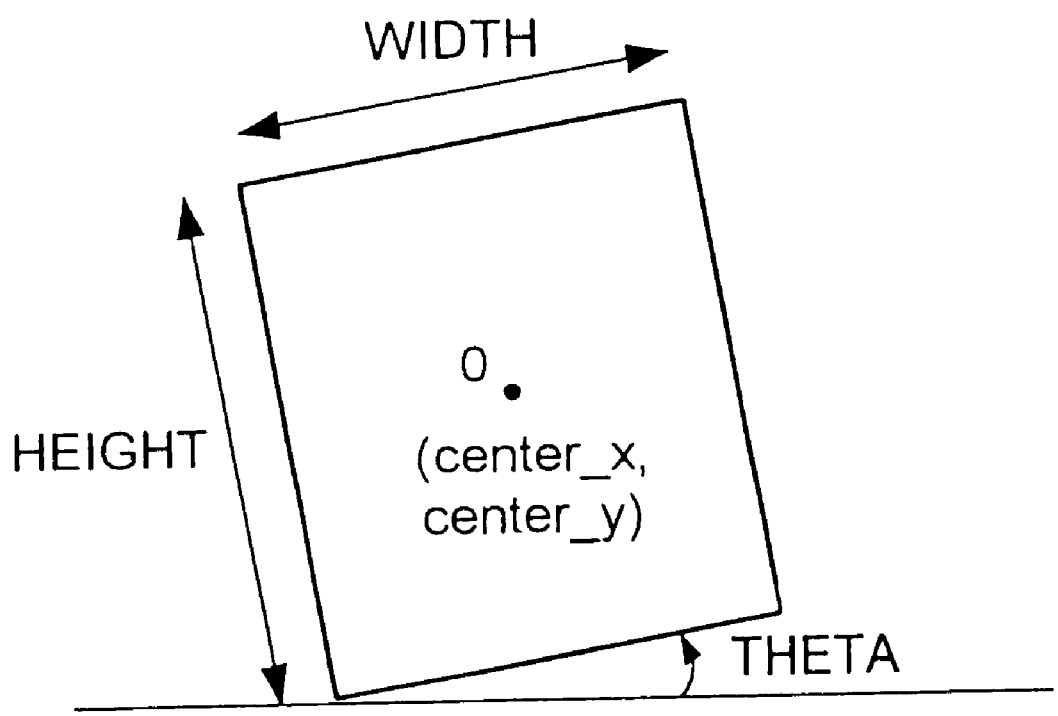
FIG. 12 is an explanatory view useful for understanding a command.

FIG. 12 is an explanatory view useful for understanding a command.

Since it happens that an execution of a command causes a proposed area to rotate on the central point O, FIG. 12 shows a proposed area in a state that it slants for the purpose of giving generality.

Here, as shown in FIG. 12, 'width' denotes a length of the side a and the side c shown in FIG. 10; 'height' denotes a length of the side b and the side d; (center_x, center_y) denotes coordinates of the central point O; and 'theta' denotes an angle where an arrow (a left rotation) shown in FIG. 12 is a normal direction. It is noted that the coordinates (center_x, center_y) of the central point O are expressed along the side of the proposed area inclined by the angle theta. A movement (an alteration of a value of the center_x) in an x-direction of the central point O means a movement of the central point O in a direction wherein the side a or the side c is extended, or in a width direction. A movement (an alteration of a value of the center_y) in a y-direction of the central point O means a movement of the central point O in a direction wherein the side b or the side d is extended, or in a height direction.

Six commands shown in Table 1 means the following contents. It is noted that $\Delta x$ and $\Delta \theta$ denote predetermined values for alteration of a proposed area.

Here, the amount of movements and the amount of rotations determined for four sides a, b, c and d are summed up, and movement and rotation are performed by the summed up amount.

(1) When the side a is 'wide', center_y is altered to center_y+($\Delta x/2$), and height is altered to height+$\Delta x$.

That is, in this case, the side a moves by $\Delta x$ toward the outside of the proposed area.

(2) When the side a is 'narrow', center_y is altered to center_y−($\Delta x/2$), and height is altered to height−$\Delta x$.

That is, in this case, the side a moves by $\Delta x$ toward the inside of the proposed area.

(3) When the side a is 'plus', theta is altered to theta+$\Delta \theta$.

That is, in this case, the proposed area is rotated on the central point O by $\Delta \theta$ in the normal direction.

(4) When the side a is 'minus', theta is altered to theta−$\Delta \theta$.

That is, in this case, the proposed area is rotated on the central point O by $\Delta \theta$ in the reversed direction.

(5) When the side a is 'hold', the amount of movement and the amount of rotation are zero.

(6) When the side a is 'unknown', according to the present embodiment, there is performed the same operation as the 'wide' in side a.

(7) When the side b is 'wide', center_x is altered to center_x+($\Delta x \times 0.9$)/2, and width is altered to width+($\Delta x \times 0.9$).

That is, in this case, the side b moves by $\Delta x \times 0.9$ toward the outside of the proposed area.

(8) When the side b is 'narrow', center_x is altered to center_x−($\Delta x \times 0.9$)/2, and width is altered to width−($\Delta x \times 0.9$).

That is, in this case, the side b moves by $\Delta x \times 0.9$ toward the outside of the proposed area.

(9) When the side b is 'plus', theta is altered to theta+Δθ.

That is, in this case, the proposed area is rotated on the central point O by Δθ in the normal direction.

(10) When the side b is 'minus', theta is altered to theta−Δθ.

That is, in this case, the proposed area is rotated on the central point O by Δθ in the reversed direction.

(11) When the side b is 'hold', the amount of movement and the amount of rotation are zero.

(12) When the side b is 'unknown', according to the present embodiment, there is performed the same operation as the 'wide' in side b.

(13) When the side c is 'wide', center_y is altered to center_y−(Δx×0.8/2), and height is altered to height+(Δx×0.8).

That is, in this case, the side c moves by Δx×0.8 toward the outside of the proposed area.

(14) When the side c is 'narrow', center_y is altered to center_y+(Δx×0.8/2), and height is altered to height−(Δx×0.8).

That is, in this case, the side c moves by Δx×0.8 toward the inside of the proposed area.

(15) When the side c is 'plus', theta is altered to theta+Δθ.

That is, in this case, the proposed area is rotated on the central point O by Δθ in the normal direction.

(16) When the side c is 'minus', theta is altered to theta−Δθ.

That is, in this case, the proposed area is rotated on the central point O by Δθ in the reversed direction.

(17) When the side c is 'hold', the amount of movement and the amount of rotation are zero.

(18) When the side c is 'unknown', according to the present embodiment, there is performed the same operation as the 'wide' in side c.

(19) When the side d is 'wide', center_x is altered to center_x−(Δx×0.7)/2, and width is altered to width+(Δx×0.7).

That is, in this case, the side d moves by Δx×0.7 toward the outside of the proposed area.

(20) When the side d is 'narrow', center_x is altered to center_x+(Δx×0.7)/2, and width is altered to width−(Δx×0.7).

That is, in this case, the side d moves by Δx×0.7 toward the outside of the proposed area.

(21) When the side d is 'plus', theta is altered to theta+Δθ.

That is, in this case, the proposed area is rotated on the central point O by Δθ in the normal direction.

(22) When the side d is 'minus', theta is altered to theta−Δθ.

That is, in this case, the proposed area is rotated on the central point O by Δθ in the reversed direction.

(23) When the side d is 'hold', the amount of movement and the amount of rotation are zero.

(24) When the side d is 'unknown', according to the present embodiment, there is performed the same operation as the 'wide' in side d.

Total of the movement amounts and the rotation amounts of the commands of the sides a, b, c and d become the current movement amount and the rotation amount.

That is, for example, when the side a is 'wide'; the side b is 'narrow'; the side c is 'hold'; and the side d is 'unknown', the 'wide' of the side a alters the center_y to the center_y+(Δx/2), and alters the height to the height+Δx; the 'narrow ' of the side b alters the center_x to the center_x+(Δx×0.9)/2, and alters the width to the width+(Δx×0.9); the 'hold' of the side c brings about no alteration of a movement of the central point and width or height in connection with the side c, and the 'unknown' of the side d alters the center_x to the center_x+(Δx×0.7)/2, and alters the width to the width−(Δx×0.7), since the 'unknown' is regarded in the same light as the 'wide' in accordance with the present embodiment.

In effect, the coordinates (center_x, center_y) of the central point is altered to (center_x−(Δx×1.6)/2, center_y+(Δx/2)), height is altered to height+Δx, and width is altered to width−(Δx×1.6).

In an alternative example, when the side a is 'plus'; the side b is 'minus'; the side c is 'wide'; and the side d is 'plus', the 'plus' of the side a alters the theta to the theta+Δθ; the 'minus' of the side b alters the theta to the theta−Δθ; the 'wide' in the side c alters the center_y to the center_y−(Δx×0.8)/2, and alters the height to the height−(Δx×0.8); and the 'plus' of the side d alters the theta to the theta+Δθ.

In effect, the coordinates (center_x, center_y) of the central point O is altered to (center_x, center_y−(Δx×0.8)/2), height is altered to height−Δx×0.8, and theta is altered to theta+Δθ.

This is also applicable to another combination of the commands allotted to the sides a to d.

When the proposed area is altered in the manner as mentioned above, then the area after the alteration is regarded as a new proposed area, the absolute value mean of the differences of the pixel values is determined on four partial segments of four sides a to d (four partial segments set up in a similar fashion also with respect to four partial segments (1) to (4) shown in FIG. 11 and the sides b to d) in the manner as explained in conjunction with FIG. 11 with respect to the new proposed area, and the commands shown in Table 1 are allotted to the sides and the new proposed area are further altered.

This is repeated, and finally, four sides a to d encircled an area, wherein all the four sides a to d offer 'hold', are determined in form of an outline of an original image. With respect to the processing in the event that all the four sides a to d don't offer the 'hold', it will be described later.

The above-mentioned algorithm will be explained in conjunction with FIG. 9. In the step b2, values for the respective sides are computed in the manner as mentioned above. In the step b3, the commands shown in Table 1 are allocated to the sides. In the step b4, it is decided whether commands for all four sides offer 'hold' and also it is decided whether the process reaches a state of an outline detection termination for an original image which will be described later. When it is decided that the outline of the original image is determined, the routine of FIG. 9 (a matching processing of the step a6 of FIG. 6) is terminated and the process returns to the block analysis processing of the step a4 of FIG. 6. On the other hand, when it is decided that the outline of the original image is not yet determined, the process goes to the step b5.

In the step b5, the history of the coordinates of the central point O determined in the step b1 is referred to, and it is decided whether the coordinates of the central point O moved exceeding a predetermined amount of movement while the closest proposed area is altered a predetermined number of times. When it is decided that the coordinates of the central point O moved, the process skips the step b6 and goes to the step b7, so that the proposed area is altered in the manner as mentioned above and an area after the alteration is set up in form of a new proposed area, and the process returns to the step b1. A one time of loop of the step b1 to the step b7 corresponds to a one time of area alteration processing 631 shown in FIG. 5.

On the other hand, in the step b5, when it is decided that the coordinates of the central point O stopped or did not move exceeding a predetermined amount of movement while the proposed area is altered a predetermined number of times, there is a high possibility of occurrence of the vibration in the above-mentioned definition, that is, a high possibility that the proposed area repeats the expansion and the contraction or repeats the normal rotation and the reverse rotation. In this case, the movement amount $\Delta x$ and the rotation amount $\Delta \theta$ are set up over again so as to be smaller values (the step b6), and the process goes to the step b7 in which am alteration of the proposed area is performed.

When the processing of FIG. 9 is repeated in the manner as mentioned above, finally, in the step b4, the end is decided (the outline of the original image is determined). Here, the end is decided not only in a case where all the commands of four sides a to d offer 'hold', but also in a case where the movement amount $\Delta x$ and the rotation amount $\Delta \theta$ are set up to sufficiently small values so that the amplitude of the vibration of the proposed area is sufficiently small.

Here, the 'unknown' shown in Table 1 means, for example, with respect to the side a, that it cannot be decided as to how the proposed area is altered in accordance with the behavior of the pixel values on the partial segments of FIG. 11. According to the present embodiment, first, the proposed area of a sufficiently smaller size than the original image is set, and when the 'unknown' appears, there is a high possibility that it is involved in the inside of the original image. Thus, when the 'unknown' appears, it is suitable that the proposed area is moved in a direction in which the proposed area is expanded. Therefore, according to the present embodiment, the 'unknown' is regarded in the same light as the 'wide' as mentioned above.

The reason why the movement amount is varied in accordance with four sides a, b, c and d as $\Delta x$, $\Delta x \times 0.9$, $\Delta x \times 0.8$, and $\Delta x \times 0.7$ in the movement amount, respectively is that it relates to the fact that according to the present embodiment, first, the proposed area of a sufficiently smaller size than the original image is set, and it often happens that after the start of the loop of FIG. 9 the proposed area is expanded for some time, and at that time, if the movement amounts of four sides a to d are set up to the same value, for example, $\Delta x$, the coordinates of the central point O does not move for some time, and the process goes via the step b5 of FIG. 9 to the step b6 in which while the proposed area still largely varies, the movement amount $\Delta x$ and the rotation amount $\Delta \theta$ are altered to be small values and whereby there is a possibility that it takes a much time to determine the outline of the original image. Set up of the movement amounts of the sides a to d to individual values makes it possible to avoid such a situation that when the proposed area is largely varied, the coordinates of the central point is stable inadvertently.

While the flowchart of FIG. 9 omits it, it is acceptable that when all the sides a to d offer the 'hold' or the vibration of the proposed area is sufficiently small, it is not immediately terminated and random numbers are added to change the proposed area, and when the proposed area after the change is converged to the same area again, it is terminated. This feature makes it possible to improve a possibility that the outline of the original image is determined with greater accuracy.

In the flowchart of FIG. 9, while there are not considered sizes and positions of sets of blocks shown in FIG. 8, the sizes and the positions of sets of the blocks are substantially the same as those of the original image. Thus, it is acceptable that it is decided whether the area encircled by the outline of the determined original image is substantially coincident with the area consisting of the sets of the block referring to information as to the sizes and the positions of sets of the block (whether they are coincident with one another in an error, for example, less than ±10%), so that it is decided whether the outline of the original image is properly determined, and when it is decided that the error exceeds ±10%, random numbers are added to alter the outline of the original image once determined, and repetition of the flow of FIG. 9 is restarted taking it as a new proposed area.

To alter the proposed area, according to the present embodiment as mentioned above, both the alteration of the position and size of the proposed area and the rotation of the proposed area are performed. it is acceptable, however, that the original image is placed on the image set surface of the color scanner to meet the corners (without inclination), and to alter the proposed area, no rotation is performed and only the alteration of the position and the size of the proposed area is performed. This scheme makes it possible to determine the outline of the original image at higher speed.

Further, according to the present embodiment, the first proposed area is automatically set up in accordance with the block analysis processing in the step a4 of FIG. 6. It is acceptable, however, that the image as shown in FIG. 7, which is obtained by the entire scan, is displayed on the display screen 22a of the workstation 20 of FIG. 2, and one point on the original image is designated through the mouse operation or the like by an operator so that an area of a predetermined size including the designated one point is designated as the proposed area. Or alternatively it is acceptable that the image as shown in FIG. 7 is displayed on the display screen 22a, and one point on the corner located at the substantially upper left and one point on the corner located at the substantially lower right of the original image are designated through the mouse operation or the like by an operator so that the rectangular area thus determined is designated as the proposed area. In this case, it is possible to obtain the approximate position information and size information of the original, and thereby further improving detection accuracy of the outline of the original image.

Thus, when the outline of all the original images is determined in accordance with image data obtained by the entire scan, the workstation 20 shown in FIG. 2 instructs the color scanner 10 to designate areas of the respective original images and perform the fine scan for only the designated areas. The color scanner 10 performs the fine scan on the portion of the original image in accordance with the instruction and sends image data of CMY obtained by the fine scan to the workstation 20. The workstation 20 performs the electronic page make-up using the image data obtained by the fine scan and other character data and the like.

In the above explanation, there is described an example in which the color scanner 10 performs two times of scans (image reading) mutually different in resolution, such as the entire scan and the fine scan. It is noted, however, that the present invention is applicable also to a case of performing such a type of processing that reading of resolution corresponding to the fine scan is performed throughout the reading surface of the color scanner through one time of scan, and the outline of the original image is determined in accordance with image data obtained by the above-mentioned reading and image data of the area of the original image is cut out from the image data (the former one).

Next, there will be explained an image input apparatus which is implemented using the workstation 20 shown in FIG. 2 and FIG. 3.

Figure 13:
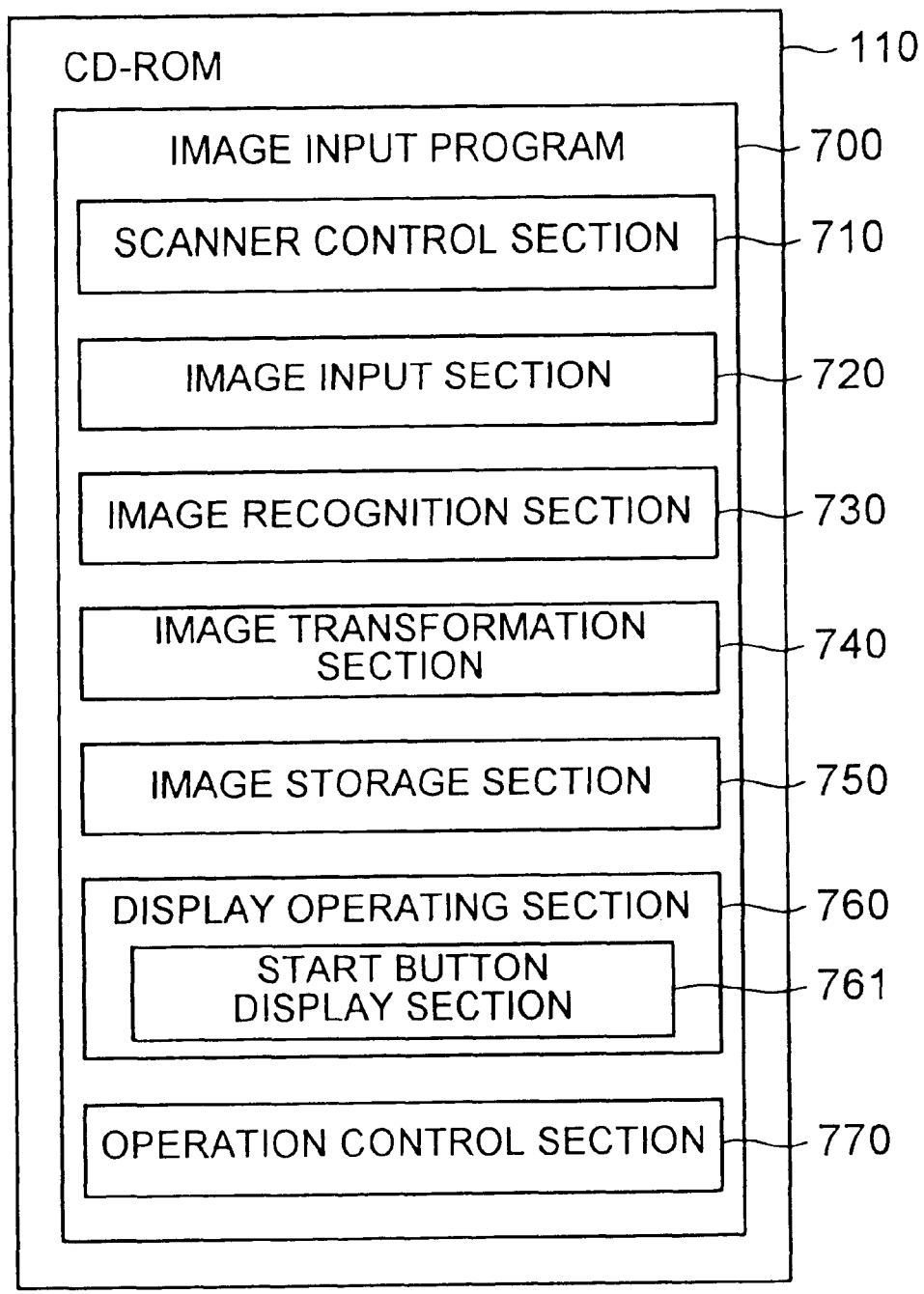
FIG. 13 is a typical illustration showing a structure of an image input program stored in a CD-ROM.

FIG. 13 is a typical illustration showing a structure of an image input program stored in a CD-ROM.

An image input program 700 stored in the CD-ROM 110 comprises a scanner control section 710, an image input section 720, an image recognition section 730, an image transformation section 740, an image storage section 750, a display operating section 760, and an operation control section 770. The display operating section 760 includes a start button display section 761 for displaying a start handler. The start button display section 761 corresponds to an example of the start handler display section referred to in the image input program stored in the image input program storage medium of the present invention. With respect to the effect of the respective sections, it will be explained in conjunction with the explanation of the flowchart of FIG. 15.

Figure 14:
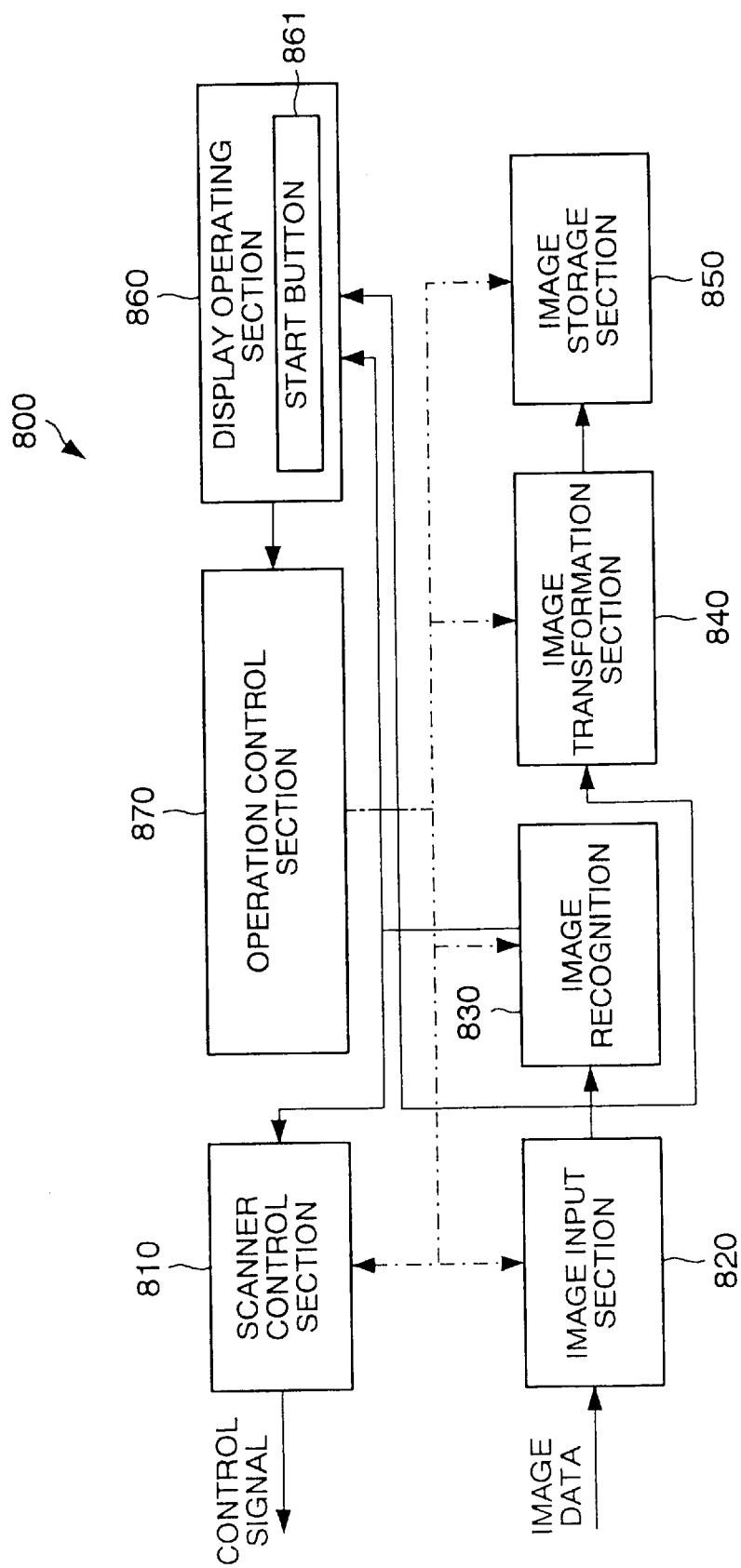
FIG. 14 is a functional block diagram of an embodiment of an image input apparatus according to the present invention.

FIG. 14 is a functional block diagram of an embodiment of an image input apparatus according to the present invention.

An image input apparatus 800 shown in FIG. 14 is implemented when an image input program 700 shown in FIG. 13 is installed in the workstation 20 shown in FIG. 1 to FIG. 3 and is executed. The image input apparatus 800 comprises a scanner control section 810, an image input section 820, an image recognition section 830, an image transformation section 840, an image storage section 850, a display operating section 860, and an operation control section 870. The display operating section 860 has a start button 861. The start button 861 corresponds to an example of the start handler referred to in the image input apparatus of the present invention. The scanner control section 810, the image input section 820, the image recognition section 830, the image transformation section 840, the image storage section 850, the display operating section 860, and the operation control section 870 correspond to the scanner control section 710, the image input section 720, the image recognition section 730, the image transformation section 740, the image storage section 750, the display operating section 760, and the operation control section 770, as program parts constituting the image input program 700 shown in FIG. 13, respectively. Those sections constituting the image input apparatus 800 are implemented by a combination of the hardware and the software. On the other hand, the program parts constituting the image input program 700 shown in FIG. 13 indicate only the portions of the application program of the associated sections of the image input apparatus of FIG. 14.

The start button display section 761 included in the display operating section 760 is a program part for displaying a start button on the display screen 22a of the workstation 20 shown in FIG. 2. The start button 861 included in the display operating section 860 shown in FIG. 14 implies a start button displayed on its display screen. Also with respect to the effect of the respective sections of the image input apparatus 800 shown in FIG. 14, it will be explained in conjunction with the explanation of the flowchart shown in FIG. 15.

Figure 15:
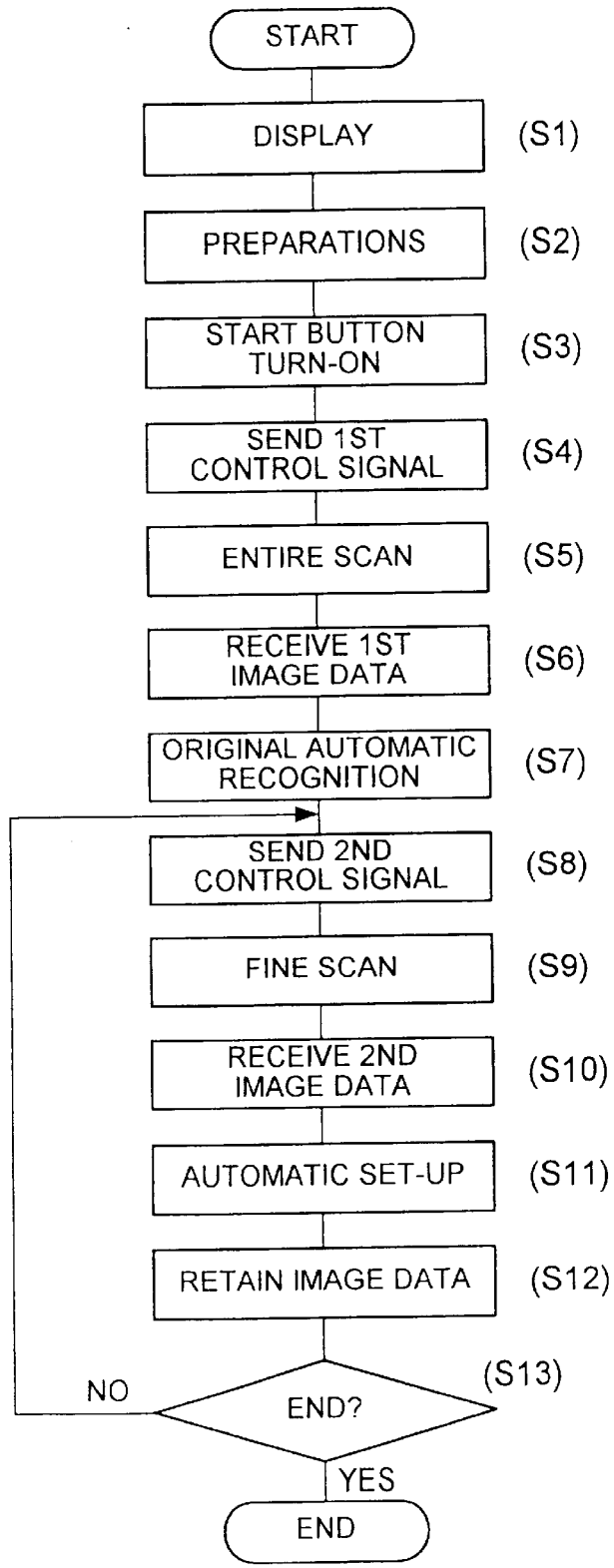
FIG. 15 is a flowchart useful for understanding an image input procedure.

FIG. 15 is a flowchart useful for understanding an image input procedure.

The flowchart of FIG. 15 includes steps of an operator's operation and image reading by the color scanner 10 shown in FIG. 2 as well as the steps of execution of the program parts of the image input program of FIG. 13.

Figure 16:
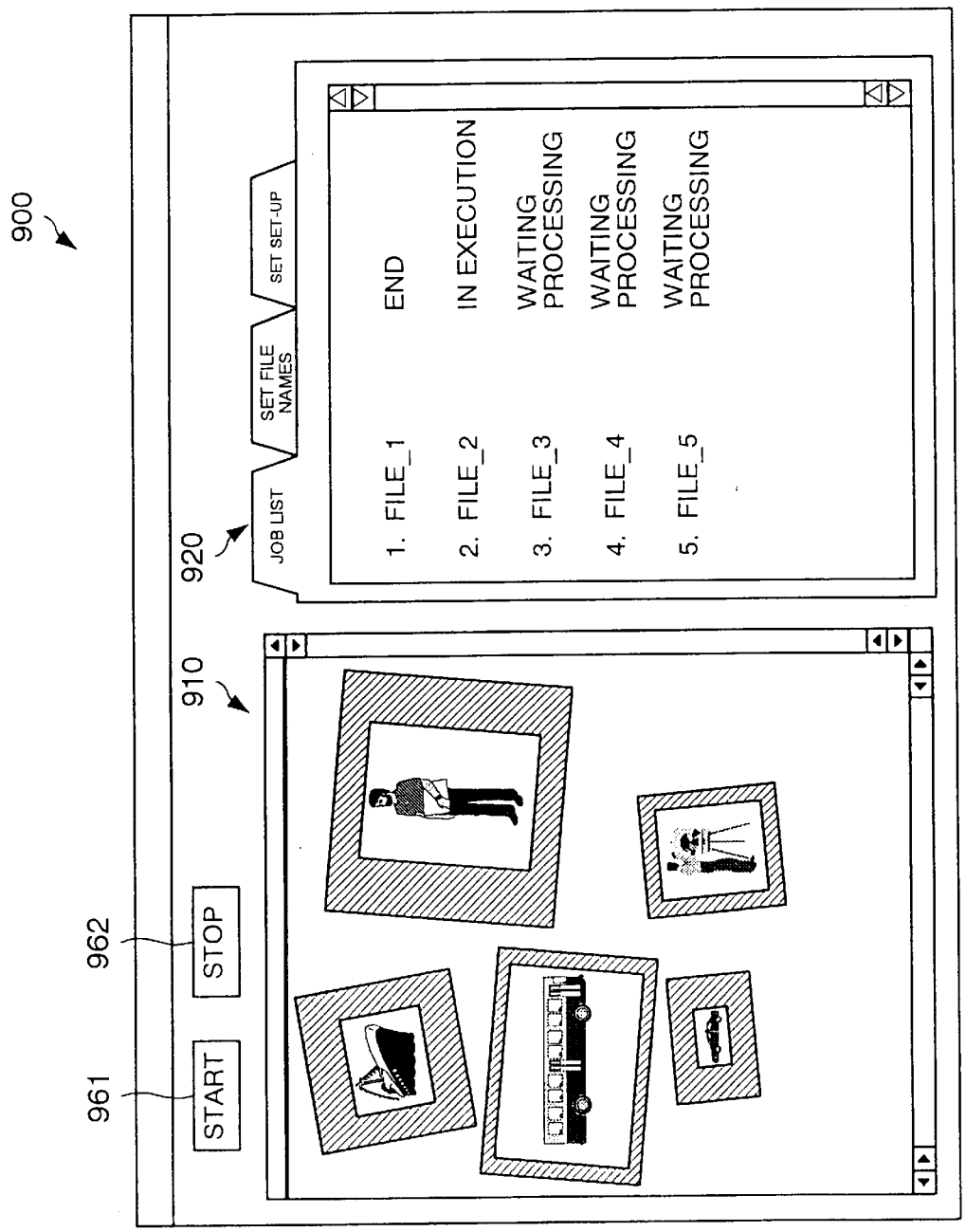
FIG. 16 is a view showing an example of a screen displayed when the image reading is actually performed.
Figure 17:
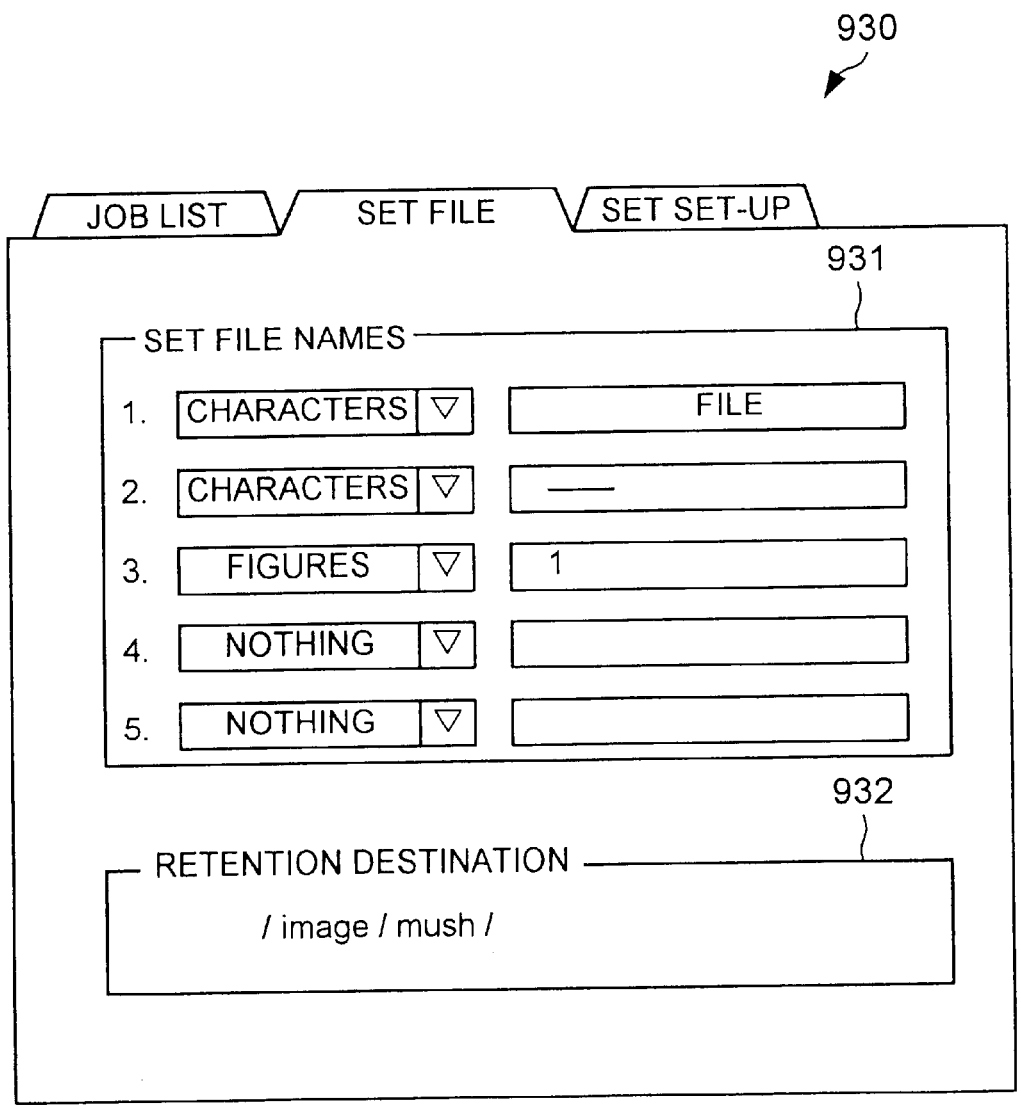
FIG. 17 is a view showing an example of a file setting screen.
Figure 18:
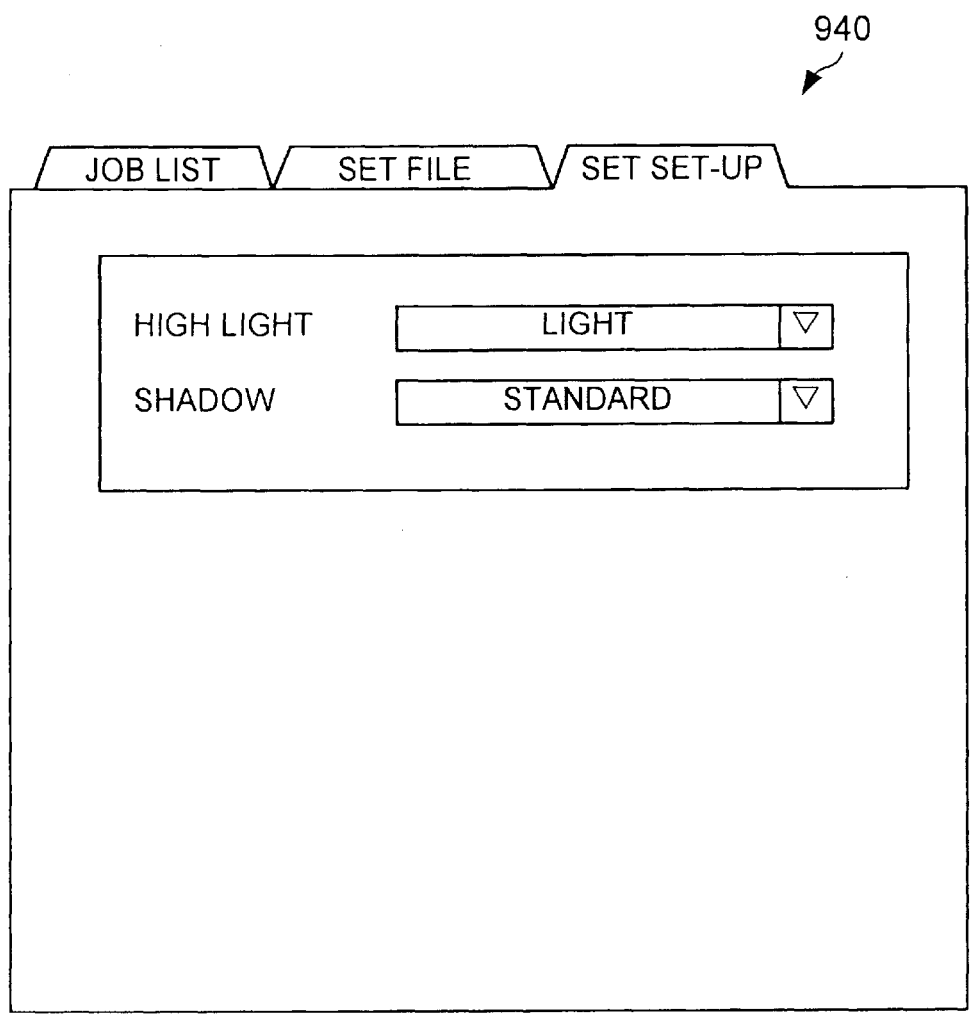
FIG. 18 is a view showing an example of a set-up setting screen.

In a step S1 and a step S2 of FIG. 15, the display operating section 760 of FIG. 13 operates, image planes shown in FIG. 16–FIG. 18 are displayed on the display screen 22a of the workstation 20 shown in FIG. 2, and a preparation work for an image input by an operator is performed.

FIG. 16 is a view showing an example of a screen displayed when the image reading is actually performed.

An image plane 900 shown in FIG. 16 comprises an overview plane 910 located at the left side, a job list image plane 920 located at the right side, a start button 961 and a stop button 962 which are disposed on the overview image plane 910. In FIG. 16, images and file names are displayed on the overview plane 910 and the job list image plane 920, but before the image input start, nothing is displayed thereon. Details of the image plane 900 of FIG. 16 will be described later.

FIG. 17 is a view showing an example of a file setting screen.

A file setting screen 930 is a screen, which is displayed instead of the job list screen of FIG. 16, when the "set file" in FIG. 16 is clicked through the mouse. In the file setting screen 930, there are set a file name of a file for storing image data obtained through reading, and a holder of a retention destination of the file.

In a setting column 931 of file names, characters or figures are set over 5 lines. That is, according to the example shown in FIG. 17, a character "FILE" is set on a first line, a character "_" is set on a second line, and a figure "1" is set on a third line. On the fourth and fifth lines, nothing is set. This means that "FILE_1" is set. This "FILE_1" is an initial value. When a plurality of files is needed, the portion of the figure is sequentially incremented, files named "FILE_1", "FILE_2" . . . , "FILE_5" are set.

In a retention destination column 932 of FIG. 17, there is designated a file name of the retention destination of the file in which image data is stored. According to the example shown in FIG. 17, "/image/mush/" is designated. In this case, five files of file names "FILE_1", "FILE_2" . . . , "FILE_5" are created on the holder of "/image/mush/", and the image data, which are obtained through reading five original images shown in the overview plane 910 of FIG. 16, respectively, are stored in the associated files, respectively.

FIG. 18 is a view showing an example of a set-up setting screen.

A set-up setting screen 940 is a screen, which is displayed instead of the job list screen 920 or the file setting screen 930 of FIG. 16 or FIG. 17, when the "set set-up" in FIG. 16 or FIG. 17 is clicked through the mouse. In the set-up setting screen 940, there are set a parameter for a set-up. The set-up referred to in the present embodiment implies that when the printed image 41 is obtained through printing by the printing machine 40 shown in FIG. 1, the image data obtained by reading of the original image by the color scanner 10 shown in FIG. 1 and FIG. 2 is converted to create image data for printing so that a good printing image can be obtained, which is excellent taking every factor, for example, contrast, tint and brightness, into consideration.

FIG. 18 shows a simple example of the set-up wherein the highlight portion (a light portion in an image) and the shadow portion (a dark portion in an image) are selected from among "light", "standard" and "dark". "light", "standard" and "dark" imply that image data is converted so that the highlight portion and the shadow portion offer a little light image, a standard light of image and a little dark image.

A technology of the set-up is well known and the detailed explanation will be omitted. For example, "Japan Printing Society Journal Vol. 31, No. 1 (1994) pages 63–65" publishes the detailed explanation of the set-up.

When the "job list" is clicked on the file setting screen 930 of FIG. 17 or the set-up setting screen 940 of FIG. 18, the set-up screen 920 in FIG. 16 is displayed. As mentioned above, at this stage, nothing appears on the overview plane 910 and the job list image plane 920.

Here, original images (according to the example shown in FIG. 16 five originals) are placed on the reading surface 12 of the color scanner 10 in FIG. 2, and the start button 961 shown in FIG. 16 is depressed (the step S3 in FIG. 15). Then, the scanner control sections 710 and 810 in FIG. 13 and FIG. 14 send first control signals instructing the entire scan to the color scanner 10, respectively (the step S4), so that the color scanner 10 performs the entire scan (the step S5).

The color scanner 10 shown in FIG. 2 has a rough mode in which the reading surface 12 is roughly read to obtain image data of relatively low resolution, and a fine mode in which the reading surface 12 is finely read to obtain image data of relatively high resolution. The reading by the former rough mode is referred to as "entire scan", and the reading by the later fine mode is referred to as "fine scan".

In the step S5 in FIG. 15, the entire scan is performed to create a first image data, which is low in resolution, representative of reading throughout the reading surface.

The image input sections 720 and 820 in FIG. 13 and FIG. 14 receive the first image data created through the entire scan and the image recognition sections 730 and 830 in FIG. 13 and FIG. 14 perform a document automatic recognition processing for determining the outline of the original images on the reading surface of the color scanner 10 in accordance with the first image data (the step S7). As the document automatic recognition processing, it is possible to adopt by way of example, the image outline determination processing which is explained in conjunction with FIG. 4 to FIG. 12.

It is noted, however, that with respect to the image input apparatus of the present invention and the image input program stored in the image input program storage medium of the present invention, it is simply a matter of an example that the image outline determination processing explained referring to FIG. 4 to FIG. 12 is adopted as the document automatic recognition processing, and it is acceptable to adopt a method of detecting a straight line corresponding to the outline of the original image by a combination of the binarization of image data and Haff transformation, as disclosed in for example Japanese Patent Publication Toku-hyou 2000-508461.

In the display operating sections 760 and 860, images throughout the reading surface based on the first image data received by the image input sections 720 and 820 are displayed on overview plane 910 in FIG. 16. When the document automatic recognition processing (the step S7) in the image recognition sections 730 and 830 is terminated, the lists (in the example shown in FIG. 16, "FILE_1", "FILE_2", . . . "FILE_5") of the file names are displayed on the job list plane 920 in FIG. 16.

Here, by way of example, the file names "FILE_1", "FILE_2", . . . are automatically allotted in turn from the original image located at the upper side of the reading surface in its central point. With respect to the characters indicative of the state of the files (in the example shown in FIG. 16, "end", "in execution" and "waiting processing"), at this stage they offer "waiting processing".

When the document automatic recognition processing of the step S7 in FIG. 16 is terminated, the process goes to the step S8 in which the scanner control sections 710 and 810 in FIG. 13 and FIG. 14 designate the outline automatically recognized in the step S7, of the original image allotted to the file name "FILE_1", and send to the color scanner 10 the second control signal to instruct that the fine scan is performed on the inside the outline (a step S8). At this stage, the display operating sections 760 and 860 in FIG. 13 and FIG. 14 alter the character indicative of the state of FILE_1 on the job list plane 920 in FIG. 16 to "in execution".

In the color scanner 10, upon receipt of the second control signal, a fine scan is performed on an area of the original image allotted to the file name "FILE_1" (a step S9), and the image input sections 720 and 820 in FIG. 13 and FIG. 14 receive the second image data of high resolution representative of the original image allotted to the file name "FILE_1", which is obtained by the fine scan, and the image transformation 740 and 840 perform an automatic set-up in accordance with the second image data for the original image associated with the file name "FILE_1" (a step S11). Here, the automatic set-up implies a set-up which is performed without subjecting to a new operation by an operator through an interruption halfway at the stage of performing the set-up (cf. the above-referenced "Japan Printing Society Journal Vol. 31, No. 10, pages 63–65". The automatic set-up in the step S11 will be described in later more in detail.

When the automatic set-up in the step S11 of FIG. 15 is performed, the image storage sections 750 and 850 in FIG. 13 and FIG. 14 perform the preservation of the image data after the set-up (a step S12). In the preservation of the image data, the image data after the set-up for the original image associated with the file name "FILE_1" is preserved in the file of the file name "FILE_1" in the retention designation holder (in the example shown in FIG. 17, /image/mush/) set on the file setting plane 930 shown in FIG. 17.

When the processing of the step S8 to step S12, the display operating sections 760 and 860 in FIG. 13 and FIG. 14 alter the character indicative of the state of FILE_1 on the job list plane 920 in FIG. 16 to "end". The operation control sections 770 and 870 in FIG. 13 and FIG. 14 determine whether there exists the original image, which is not yet subjected to the processing of the step S8 to step S12 (a step S13). When it is decided that there is the original image, which is not yet subjected to the processing of the step S8 to step S12, the process goes to the step S8 in which the same processing is carried out for the successive original image (here, the original image associated with "FILE_2"). At this stage, the job list image plane 920 in FIG. 16 shows that the processing is terminated on "FILE_1", the processing is in execution on "FILE_2", and the processing is in a state of waiting on the remaining files.

When this is repeated and the processing of the step S8 to the step S12 for all the original images is terminated in the step S13, the image input processing shown in FIG. 15 is terminated.

Incidentally, in the operation control sections 770 and 870 shown in FIG. 13 and FIG. 14, the sequence control is performed in such a manner that not only the decision processing in the step S13 but also the processing for all the sections in FIG. 14 are properly performed.

Next, there will be explained the automatic set-up (the step S11 in FIG. 15) by the image transformations 740 and 840 in FIG. 13 and FIG. 14.

Figure 19:
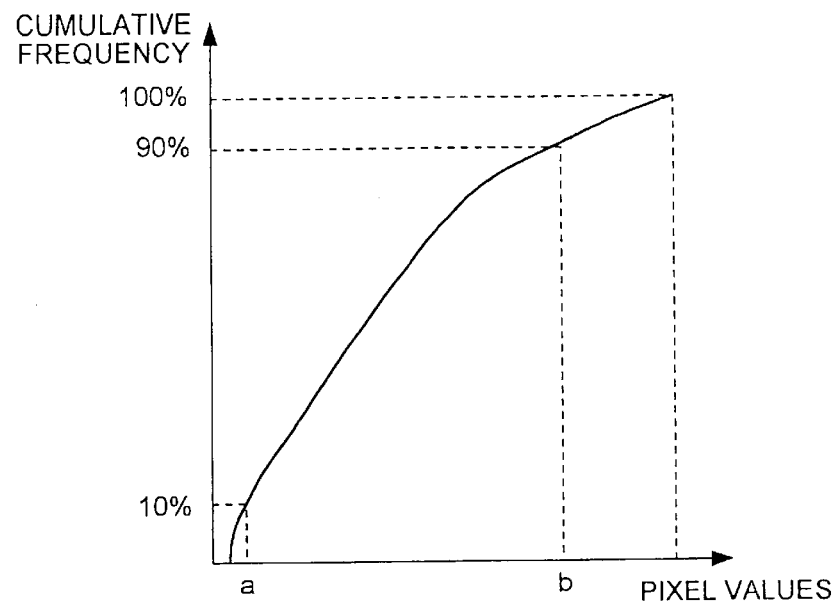
FIG. 19 is a view showing a cumulative frequency of pixel values of image data associated with a certain original image.

FIG. 19 is a view showing a cumulative frequency of pixel values of the second image data (hereinafter, it will be simply referred to as "image data" omitting "second") of a high resolution associated with a certain original image, which is created by the fine scan in the step S9 in FIG. 15 and received by the workstation 20 in the step S10.

Here, the cumulative frequency is normalized with 0% to 100%. In this case, by way of example, the pixel values a and b for the cumulative frequency 10% and 90% are determined, respectively.

Figure 20:
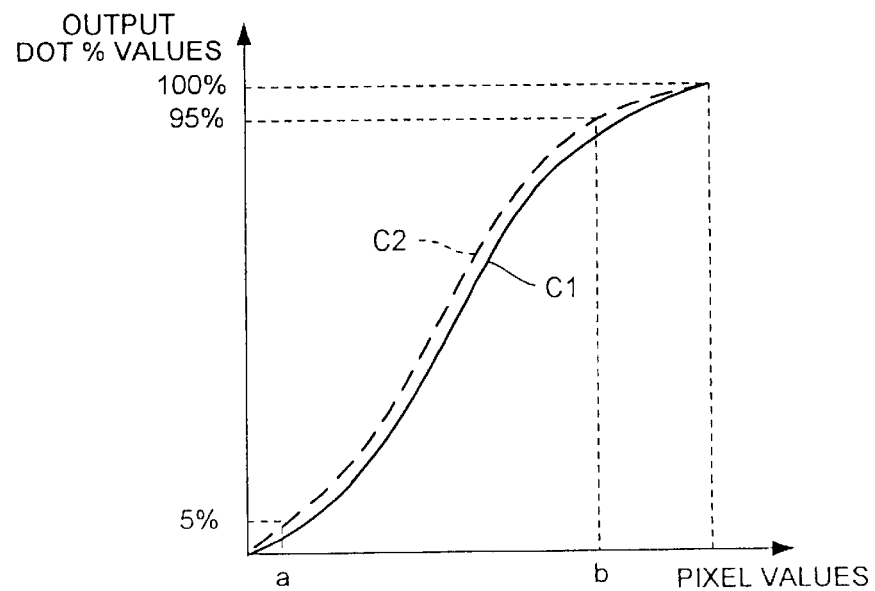
FIG. 20 is a view showing an example of an image transformation at the time of the set-up.

FIG. 20 is a view showing an example of an image transformation at the time of the set-up.

A predetermined standard curve C1 is modified to a curve C2 so that the pixel values a and b for the cumulative frequency 10% and 90%, which are determined from the cumulative frequency curve in the manner as mentioned above, become output pixel values (here, dot % values representative of multi-tone level of 0% to 100%) 5% and 95%, and the pixel values of the image data representative of the original image are transformed to the dot % values in accordance with the modified curve C2.

When the highlight portion or the shadow portion is set to "light" on the set-up setting screen 940 shown in FIG. 18, in FIG. 19, as the pixel values a and b, for example, the pixel values of 15% or 95% in the cumulative frequency are selected. This selection may transform the highlight portion or the shadow portion to dot % values representative of slightly light image.

On the other hand, when the highlight portion or the shadow portion is set to "dark" on the set-up setting screen 940 shown in FIG. 18, in FIG. 19, as the pixel values a and b, for example, the pixel values of 5% or 85% in the cumulative frequency are selected. This selection may transform the highlight portion or the shadow portion to dot % values representative of slightly dark image.

In the step S12 in FIG. 15, by way of the example, the above-mentioned automatic set-up is performed. while the simple processing of the automatic set-up is explained here, it is acceptable that a high level of automatic set-up processing is adopted.

As mentioned above, according to the present invention, simple mouse clicking of the start button 961 shown in FIG. 16 makes it possible to perform a series of processing of detection of the outline of the original image placed on the reading surface 12 of the color scanner 10, reading of the high resolution in the area of the original image, the automatic set-up, and a preservation of the image data after the automatic set-up, without interruption of the processing.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image outline determination method of determining an outline of an original image placed on a reading surface of a scanner in accordance with image data obtained by the scanner, said image outline determination method comprising:

an area designation step of designating a rectangular proposed area of which at least a portion enters into an area of the original image placed on the reading surface; and an outline determination step of determining the outline of the original image by repeating a plurality of number of times an area alteration processing in which a movement of sides defining an outline of the proposed area outside or inside the proposed area is determined in accordance with differential or difference of image data for vicinity of the sides, and the proposed area is altered in accordance with a decision of the movement, said area alteration processing being repeated taking an area after the proposed area is altered as a new proposed area.

2. An image outline determination method according to claim 1, wherein said outline determination step is a step in which said area alteration processing is replaced by an alternative area alteration processing in which a movement of sides defining an outline of the proposed area outside or inside the proposed area is determined in accordance with differential or difference of image data for vicinity of the sides and in addition a rotation of the proposed area in a normal direction or in a reversed direction is determined, and the proposed area is altered in accordance with a decision of the movement and the rotation, said alternative area alteration processing being repeated.

3. An image outline determination method according to claim 1, wherein the alteration processing is determined in accordance with differential or difference of image data correlated with brightness.

4. An image outline determination method according to claim 1, wherein image data includes information derived from one of CMY (cyan, magenta, yellow) and RGB (red, green, and blue).

5. An image outline determination method according to claim 1, wherein said area alteration processing includes a processing in which a statistical value of each of a plurality of segments is determined for each side and a movement of each side is determined in accordance with statistical values for the plurality of segments.

6. An image outline determination apparatus for determining an outline of an original image placed on a reading surface of a scanner in accordance with image data obtained by the scanner, said image outline determination apparatus comprising:

an area designation section for designating a rectangular proposed area of which at least portion enters into an area of the original image placed on the reading surface; and an outline determination section for determining the outline of the original image by repeating a plurality of number of times an area alteration processing in which a movement of sides defining an outline of the proposed area outside or inside the proposed area is determined in accordance with differential or difference of image data for vicinity of the sides, and the proposed area is altered in accordance with a decision of the movement, said area alteration processing being repeated taking an area after the proposed area is altered as a new proposed area.

7. An image outline determination apparatus according to claim 6, wherein said area alteration processing is a processing in which an average value of four partial segments is determined for each side where two segments parallel to an associated side and having a substantially same length as the associated side are divided into two parts at the center for each side with respect to differential or difference of image data along the two segments for each side in the vicinity of the associated side, and a movement of the associated side outside or inside the proposed area is determined in accordance with a combination of four average values for each side.

8. An image outline determination apparatus according to claim 6, wherein said area alteration processing determines the movement of the associated side outside or inside the proposed area for each side, and moves the side determined in movement by a movement distance set to a mutually different value for each side.

9. An image outline determination apparatus according to claim 6, wherein said outline determination section determines beforehand a history of a coordinate value of a representative point of a proposed area to be sequentially altered, while said area alteration processing is repeated, and detects a vibration of an alteration of the proposed area to be sequentially altered in accordance with the history, and when the vibration is detected, said outline determination section alters an amount of movement of a respective side in said area alteration processing to a smaller value and repeats said area alteration processing.

10. An image outline determination apparatus according to claim 6, wherein said outline determination section extracts image data correlated with brightness of respective points of an image from the image data obtained by said scanner and determines the movement of the sides outside or inside the proposed area in accordance with the image data correlated with the brightness.

11. An image outline determination apparatus according to claim 6, wherein said outline determination section is a section in which said area alteration processing is replaced by an alternative area alteration processing in which a movement of sides defining an outline of the proposed area outside or inside the proposed area is determined in accordance with differential or difference of image data for vicinity of the sides and in addition a rotation of the proposed area in a normal direction or in a reversed direction is determined, and the proposed area is altered in accordance with a decision of the movement and the rotation, said alternative area alteration processing being repeated.

12. An image outline determination apparatus according to claim 11, wherein said area alteration processing is a processing in which an average value of four partial segments is determined for each side where two segments parallel to an associated side and having a substantially same length as the associated side are divided into two parts at the center for each side with respect to differential or difference of image data along the two segments for each side in the vicinity of the associated side, and a movement of the associated side outside or inside the proposed area and a rotation of the proposed area in a normal direction or in a reversed direction is determined in accordance with a combination of four average values for each side.

13. An image outline determination apparatus according to claim 11, wherein said outline determination section determines beforehand a history of a coordinate value of a representative point of a proposed area to be sequentially altered, while said area alteration processing is repeated, and detects a vibration of an alteration of the proposed area to be sequentially altered in accordance with the history, and when the vibration is detected, said outline determination section alters an amount of movement of a respective side in said area alteration processing and an amount of rotation of the proposed area to a smaller value and repeats said area alteration processing.

14. An image outline determination apparatus according to claim 11, wherein said outline determination section extracts image data correlated with brightness of respective points of an image from the image data obtained by said scanner and determines the movement of the sides outside or inside the proposed area and the rotation of the proposed area in a normal direction or in a reversed direction in accordance with the image data correlated with the brightness.

15. An image outline determination apparatus according to claim 11, wherein said area designation section determines an average value of differential or difference of image data for a plurality of areas on the reading surface and designates the proposed area in accordance with the average value.

16. An image outline determination apparatus according to claim 11, wherein when a plurality of original images are simultaneously placed on the reading surface, said area designation section designates, upon receipt of a decision of the outline of the original image by said outline determination section, a new proposed area associated with an original image different from the original image determined in an outline by said outline determination section at a position out of the outline of the original image determined by said outline determination section, on the reading surface, and said outline determination section restarts, upon receipt of the new proposed area by said area designation section, a repetition of said area alteration processing.

17. An image outline determination apparatus according to claim 6, wherein said area designation section determines an average value of differential or difference of image data for a plurality of areas on the reading surface and designates the proposed area in accordance with the average value.

18. An image outline determination apparatus according to claim 6, wherein when a plurality of original images are simultaneously placed on the reading surface, said area designation section designates, upon receipt of a decision of the outline of the original image by said outline determination section, a new proposed area associated with an original image different from the original image determined in an outline by said outline determination section at a position out of the outline of the original image determined by said outline determination section, on the reading surface, and said outline determination section restarts, upon receipt of the new proposed area by said area designation section, a repetition of said area alteration processing.

19. An image outline determination apparatus according to claim 6, wherein the alteration processing is determined in accordance with differential or difference of image data correlated with brightness.

20. An image outline determination apparatus according to claim 6, wherein image data includes information derived from one of CMY (cyan, magenta, yellow) and RGB (red, green, and blue).

21. An image outline determination apparatus according to claim 6, wherein said area alteration processing includes a processing in which a statistical value of each of a plurality of segments is determined for each side and a movement of each side is determined in accordance with statistical values for the plurality of segments.

22. An image outline determination program storage medium storing an image outline determination program which causes a computer to operate as an image outline determination apparatus for determining an outline of an original image placed on a reading surface of a scanner in accordance with image data obtained by the scanner, said image outline determination program stored in said image outline determination program storage medium comprising:

an area designation section for designating a rectangular proposed area of which at least portion enters into an area of the original image placed on the reading surface; and an outline determination section for determining the outline of the original image by repeating a plurality of number of times an area alteration processing in which a movement of sides defining an outline of the proposed area outside or inside the proposed area is determined in accordance with differential or difference of image data for vicinity of the sides, and the proposed area is altered in accordance with a decision of the movement, said area alteration processing being repeated taking an area after the proposed area is altered as a new proposed area.

23. An image outline determination program storage medium according to claim 22, wherein said outline determination section is a section in which said area alteration processing is replaced by an alternative area alteration processing in which a movement of sides defining an outline of the proposed area outside or inside the proposed area is determined in accordance with differential or difference of image data for vicinity of the sides and in addition a rotation of the proposed area in a normal direction or in a reversed direction is determined, and the proposed area is altered in accordance with a decision of the movement and the rotation, said alternative area alteration processing being repeated.

24. An image input apparatus comprising:

a scanner control section for controlling a scanner by a control signal, said scanner having a reading surface on which an original image is placed to be read and generating image data through reading the reading surface when said scanner receives the control signal;

an image input section for receiving the image data generated by said scanner;

an image recognition section for recognizing an outline of an original image placed on the reading surface in accordance with the image data obtained through reading throughout the reading surface, which is fed to said image input section;

an image transformation section for performing a transformation of image data inside an image area encircled by the outline of the original image recognized by said image recognition section into reproduction image data to output a reproduction image in which image quality is adjusted by an output device for outputting the reproduction image in accordance with the reproduction image data;

an image storage section for storing the reproduction image data obtained by said image transformation section;

a start handler for instructing a start of reading of an original image; and an operation control section responsive to an operation of said start handler for continuously performing a series of operations of a control for said scanner by said scanner control section, a receipt of the image data by said image input section, a recognition of the outline of the original image by said image recognition section, a transformation into the reproduction image data by said image transformation section, and a storage of the reproduction image data by said image storage section, said series operations being performed without being subjected to an operation by an operator halfway.

25. An image input apparatus according to claim 24, wherein said scanner has a first reading mode in which said reading surface is roughly read to generate a first image data of relatively low resolution, and a second reading mode in which said reading surface is finely read to generate a second image data of relatively high resolution, said operation control section causes, upon receipt of an operation of said start handler by an operator, said scanner control section to send to said scanner a first control signal to perform a reading in the first reading mode, said image input section to receive the first image data obtained in the first reading mode by said scanner, said image recognition section to recognize an outline of an original image in accordance with the first image data, said scanner control section to send to said scanner a second control signal to perform a reading in the second reading mode, said image input section to receive the second image data obtained in the second reading mode by said scanner, said image transformation section to transform the second image data inside the image area encircled by the outline of the original image recognized by said image recognition section in accordance with the first image data into the reproduction image data, and said image storage section to store the reproduction image data transformed from the second image data.

26. An image input program storage medium storing an image input program which causes a computer to operate as an image input apparatus for receiving image data obtained by a scanner having a reading surface on which an original image is placed to be read, said scanner generating the image data through reading the reading surface when said scanner receives a control signal, said image input program stored in said image input program storage medium comprising:

a scanner control section for controlling said scanner by a control signal;

an image input section for receiving the image data generated by said scanner;

an image recognition section for recognizing an outline of an original image placed on the reading surface in accordance with the image data obtained through reading throughout the reading surface, which is fed to said image input section;

an image transformation section for performing a transformation of image data inside an image area encircled by the outline of the original image recognized by said image recognition section into reproduction image data to output a reproduction image in which image quality is adjusted by an output device for outputting the reproduction image in accordance with the reproduction image data;

an image storage section for storing the reproduction image data obtained by said image transformation section;

a start handler display section for displaying a start handler for instructing a start of reading of an original image; and an operation control section responsive to an operation of said start handler for continuously performing a series of operations of a control for reading of said scanner by said scanner control section, a receipt of the image data by said image input section, a recognition of the outline of the original image by said image recognition section, a transformation into the reproduction image data by said image transformation section, and a storage of the reproduction image data by said image storage section, said series operations being performed without being subjected to an operation by an operator halfway.

27. An image input program storage medium according to claim 26, wherein said scanner has a first reading mode in which said reading surface is roughly read to generate a first image data of relatively low resolution, and a second reading mode in which said reading surface is finely read to generate a second image data of relatively high resolution, said operation control section causes, upon receipt of an operation of said start handler by an operator, said scanner control section to send to said scanner a first control signal to perform a reading in the first reading mode, said image input section to receive the first image data obtained in the first reading mode by said scanner, said image recognition section to recognize an outline of an original image in accordance with the first image data, said scanner control section to send to said scanner a second control signal to perform a reading in the second reading mode, said image input section to receive the second image data obtained in the second reading mode by said scanner, said image transformation section to transform the second image data inside the image area encircled by the outline of the original image recognized by said image recognition section in accordance with the first image data into the reproduction image data, and said image storage section to store the reproduction image data transformed from the second image data.

* * * * *